US011928587B2

(12) United States Patent
Wang et al.

(10) Patent No.: US 11,928,587 B2
(45) Date of Patent: Mar. 12, 2024

(54) BASE STATION-USER EQUIPMENT MESSAGING REGARDING DEEP NEURAL NETWORKS

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 876 days.

(21) Appl. No.: 16/970,941

(22) PCT Filed: Aug. 14, 2019

(86) PCT No.: PCT/US2019/046535
§ 371 (c)(1),
(2) Date: Aug. 18, 2020

(87) PCT Pub. No.: WO2021/029889
PCT Pub. Date: Feb. 18, 2021

(65) Prior Publication Data
US 2021/0342687 A1 Nov. 4, 2021

(51) Int. Cl.
G06N 3/045 (2023.01)
G06N 3/08 (2023.01)
(Continued)

(52) U.S. Cl.
CPC .............. G06N 3/08 (2013.01); G06N 3/045 (2023.01); H04W 72/23 (2023.01); H04W 92/10 (2013.01)

(58) Field of Classification Search
CPC .......... G06N 3/08; G06N 3/045; G06N 3/044; H04W 72/23; H04W 92/10
See application file for complete search history.

(56) References Cited

U.S. PATENT DOCUMENTS 6,347,091 B1    2/2002   Wallentin et al.
10,157,293 B2   12/2018  Woss et al.
(Continued)

FOREIGN PATENT DOCUMENTS

CN    107181600    9/2017
EP    3418948      12/2018
(Continued)

OTHER PUBLICATIONS

"International Search Report and Written Opinion", Application No. PCT/US2019/058328, dated Jul. 21, 2020, 12 pages.
(Continued)

Primary Examiner — Said M Elnoubi
(74) Attorney, Agent, or Firm — Womble Bond Dickinson (US) LLP

(57) ABSTRACT

Techniques and apparatuses are described for enabling base station-user equipment messaging regarding deep neural networks. A network entity (base station 121, core network server 320) determines a neural network formation configuration (architecture and/or parameter configurations 1208) for a deep neural network (deep neural network(s) 604, 608, 612, 616) for processing communications transmitted over the wireless communication system. The network entity (base station 121, core network server 302) communicates the neural network formation configuration to a user equipment (UE 110). The user equipment (UE 110) configures a first neural network (deep neural network(s) 608, 612) based on the neural network formation configuration. In implementations, the user equipment (UE 110) recovers information communicated over the wireless network using the first neural network (deep neural network(s) 608, 612). This allows the wireless communication system to adapt to changing operating conditions and improve information recovery.

19 Claims, 21 Drawing Sheets

(51) Int. Cl.
*H04W 72/23* (2023.01)
*H04W 92/10* (2009.01)

(56) References Cited

U.S. PATENT DOCUMENTS

| | | | |
|---|---|---|---|
| 10,157,324 | B2 | 12/2018 | Aguera-Arcas |
| 10,375,585 | B2 | 8/2019 | Tan et al. |
| 10,461,421 | B1 | 10/2019 | Tran et al. |
| 2012/0054131 | A1 | 3/2012 | Williamson |
| 2015/0141027 | A1 | 5/2015 | Tsui et al. |
| 2016/0078339 | A1 | 3/2016 | Li et al. |
| 2016/0155050 | A1 | 6/2016 | Buibas et al. |
| 2016/0262167 | A1 | 9/2016 | Lan et al. |
| 2016/0328644 | A1 | 11/2016 | Lin et al. |
| 2017/0105210 | A1 | 4/2017 | Jeich et al. |
| 2017/0367036 | A1 | 12/2017 | Chen et al. |
| 2018/0034695 | A1 | 2/2018 | Balasubramanian et al. |
| 2018/0039884 | A1 | 2/2018 | Dalton et al. |
| 2018/0167778 | A1 | 6/2018 | Kodaypak |
| 2018/0287891 | A1 | 10/2018 | Shaw et al. |
| 2018/0317133 | A1 | 11/2018 | Sciancalepore et al. |
| 2018/0324888 | A1* | 11/2018 | Shi ............... H04W 76/27 |
| 2018/0349508 | A1 | 12/2018 | Bequet et al. |
| 2018/0367985 | A1 | 12/2018 | Thomas |
| 2019/0014488 | A1 | 1/2019 | Tan et al. |
| 2019/0044535 | A1 | 2/2019 | Ahmad |
| 2019/0073607 | A1 | 3/2019 | Jia et al. |
| 2019/0087689 | A1 | 3/2019 | Chen |
| 2019/0132708 | A1 | 5/2019 | Beighoul et al. |
| 2019/0138934 | A1 | 5/2019 | Prakash et al. |
| 2019/0171937 | A1 | 6/2019 | Lin et al. |
| 2019/0188285 | A1 | 6/2019 | Scheau et al. |
| 2019/0188553 | A1 | 6/2019 | Such et al. |
| 2019/0208438 | A1 | 7/2019 | Yang et al. |
| 2019/0223073 | A1 | 7/2019 | Chen |
| 2019/0239238 | A1* | 8/2019 | Calabrese ............. H04W 28/16 |
| 2019/0268779 | A1 | 8/2019 | Peroulas et al. |
| 2019/0279082 | A1 | 9/2019 | Moloney et al. |
| 2019/0370636 | A1 | 12/2019 | Isopoussu |
| 2019/0372644 | A1 | 12/2019 | Chen et al. |
| 2019/0387372 | A1 | 12/2019 | Pedersen |
| 2019/0387448 | A1 | 12/2019 | Stauffer et al. |
| 2020/0053591 | A1 | 2/2020 | Prasad |
| 2020/0113017 | A1 | 4/2020 | Logothetis et al. |
| 2020/0229206 | A1 | 7/2020 | Badic et al. |
| 2020/0271743 | A1 | 8/2020 | Takeshima et al. |
| 2020/0272899 | A1 | 8/2020 | Dunne et al. |
| 2020/0351718 | A1 | 11/2020 | Dong |
| 2020/0364187 | A1 | 11/2020 | Tran |
| 2020/0366326 | A1* | 11/2020 | Jassal ............... H04L 41/16 |
| 2020/0366385 | A1 | 11/2020 | Ge et al. |
| 2020/0366537 | A1 | 11/2020 | Wang et al. |
| 2020/0382929 | A1 | 12/2020 | Shi et al. |
| 2021/0049451 | A1 | 2/2021 | Wang et al. |
| 2021/0064996 | A1 | 3/2021 | Wang et al. |
| 2021/0075691 | A1 | 3/2021 | Zeng et al. |
| 2021/0112425 | A1 | 4/2021 | Tran et al. |
| 2021/0158151 | A1 | 5/2021 | Wang et al. |
| 2021/0167875 | A1 | 6/2021 | Shen et al. |
| 2021/0182658 | A1 | 6/2021 | Wang et al. |
| 2021/0218460 | A1* | 7/2021 | Garcia ............... G06N 20/00 |
| 2021/0266125 | A1 | 8/2021 | Pezeshki et al. |
| 2021/0345134 | A1 | 11/2021 | Ottersten et al. |
| 2021/0385682 | A1 | 12/2021 | Bedekar et al. |
| 2021/0406677 | A1 | 12/2021 | Wang |

FOREIGN PATENT DOCUMENTS

| | | |
|---|---|---|
| RU | 2010100877 | 7/2011 |
| WO | 2017091115 | 6/2017 |
| WO | 2018110985 | 6/2018 |
| WO | 2018149898 | 8/2018 |
| WO | 2018150083 | 8/2018 |
| WO | 20190116560 | 4/2019 |
| WO | 20190104280 | 5/2019 |
| WO | 2019116352 | 6/2019 |
| WO | 2019133049 | 7/2019 |
| WO | 2019137286 | 7/2019 |
| WO | 2019141902 | 7/2019 |
| WO | WO-2019141902 A1 * | 7/2019 |
| WO | 2019211134 | 11/2019 |
| WO | 2020171803 | 8/2020 |
| WO | 2020229684 | 11/2020 |
| WO | 2021029891 | 2/2021 |
| WO | 2021045748 | 3/2021 |
| WO | 2021086369 | 5/2021 |
| WO | 20210863008 | 5/2021 |
| WO | 2021107831 | 6/2021 |
| WO | 2021108082 | 6/2021 |
| WO | 2021118713 | 6/2021 |
| WO | 2021247254 | 12/2021 |
| WO | 2022005711 | 1/2022 |
| WO | 2022010685 | 1/2022 |

OTHER PUBLICATIONS

Dahlman, et al., "Carrier Aggregation", Retrieved at: https://www.sciencedirect.com/topics/engineering/carrier-aggregation—on Sep. 17, 2020, 2016, 14 pages.

Raghu, et al., "Deep Reinforcement Learning Based Power Control for Wireless Multicast Systems", Oct. 24, 2019, 9 pages.

Silver, "3 Ways Nokia Is Using Machine Learning in 5G Networks", Retrieved at: https://spectrum.ieee.org/tech-talk/telecom/wireless/3-ways-nokia-is-using-machine-learning-in-5g-networks, Jun. 25, 2018, 3 pages.

Tuban, et al., "Genetic Algorithm Approach for Dynamic Configuration of Multicast Broadcast Single Frequency Network Deployment in LTE", Nov. 2011, 5 pages.

Xu, et al., "Energy-Efficient Chance-Constrained Resource Allocation for Multicast Cognitive OFDM Network", May 2016, 8 pages.

"International Preliminary Report on Patentability", Application No. PCT/US2019/046535, dated Feb. 8, 2022, 10 pages.

"International Preliminary Report on Patentability", Application No. PCT/US2019/046546, dated Feb. 8, 2022, 8 pages.

"International Preliminary Report on Patentability", Application No. PCT/US2020/058487, dated Mar. 4, 2022, 16 pages.

"International Preliminary Report on Patentability", Application No. PCT/US2019/049566, dated Mar. 8, 2022, 8 pages.

"International Preliminary Report on Patentability", Application No. PCT/US2020/058557, dated Mar. 14, 2022, 8 pages.

"International Search Report and Written Opinion", Application No. PCT/US2021/036497, dated Feb. 7, 2022, 18 pages.

Liu, et al., "HierTrain: Fast Hierarchical Edge AI Learning with Hybrid Parallelism in Mobile-Edge-Cloud Computing", Mar. 22, 2020, 11 pages.

Zhu, et al., "A Supervised Learning Based QoS Assurance Architecture for 5G Networks", Mar. 25, 2019, 9 pages.

"International Search Report and Written Opinion", Application No. PCT/US2021/033645, dated Sep. 16, 2021, 17 pages.

"International Search Report and Written Opinion", Application No. PCT/US2021/039408, dated Dec. 1, 2021, 11 pages.

"Invitation to Pay Additional Fees", Application No. PCT/US2020/058487, dated Sep. 23, 2021, 4 pages.

"Invitation to Pay Additional Fees", Application No. PCT/US2021/036497, dated Sep. 28, 2021, 11 pages.

"Written Opinion", Application No. PCT/US2020/058557, dated Oct. 20, 2021, 7 pages.

"Written Opinion", Application No. PCT/US2020/058487, dated Oct. 25, 2021, 14 pages.

Chen, et al., "A Joint Learning and Communications Framework for Federated Learning Over Wireless Networks", IEEE Transactions on Wireless Communications, Sep. 17, 2019, 30 pages.

Kang, et al., "Neurosurgeon: Collaborative Intelligence Between the Cloud and Mobile Edge", ACM SIGARCH Computer Architecture News, Apr. 2017, 11 pages.

Khan, et al., "Self Organizing Federated Learning Over Wireless Networks: A Socially Aware Clustering Approach", 2020 International Conference on Information Networking, Jan. 7, 2020, 6 pages.

(56) References Cited

OTHER PUBLICATIONS

Miyamoto, et al., "AI-Assisted Workflow Management Framework for Automated Closed-Loop Operation", IEEE/IFIP Network Operations and Management Symposium, Apr. 2018, 6 pages.
Nishio, et al., "Client Selection for Federated Learning with Heterogeneous Resources in Mobile Edge", IEEE International Conference on Communications, May 20, 2019, 11 pages.
Sun, et al., "Adaptive Federated Learning with Gradient Compression in Uplink NOMA", Cornell University Library, Mar. 3, 2020, 10 pages.
Wang, et al., "Convergence of Edge Computing and Deep Learning: A Comprehensive Survey", IEEE Communications Surveys & Tutorials pp. (99):1-1, Jan. 2020, 36 pages.
"International Preliminary Report on Patentability", Application No. PCT/US2019/059094, dated May 3, 2022, 11 pages.
"International Preliminary Report on Patentability", Application No. PCT/US2019/058328, dated May 3, 2022, 7 pages.
"Non-Final Office Action", U.S. Appl. No. 16/714,341, filed May 2, 2022, 12 pages.
"Notice of Allowance", U.S. Appl. No. 16/957,367, filed May 4, 2022, 8 pages.
Guo, et al., "Exploiting Future Radio Resources With End-to-End Prediction by Deep Learning", Dec. 2018, 19 pages.
"Architectural Framework for Machine Learning in Future Networks Including IMT-2020", Draft new Recommendation ITU-T Y.IMT2020-ML-Arch, Apr. 30, 2019, 28 pages.
"Discussion on AI/ML Model Transfer in 5GS", 3GGP SA WG1 #88, Nov. 2019, 13 pages.
"Foreign Office Action", EP Application No. 19805861.2, dated Jan. 14, 2021, 10 pages.
"International Search Report and Written Opinion", Application No. PCT/US2020/058487, dated Mar. 9, 2021, 22 pages.
"International Search Report and Written Opinion", Application No. PCT/US2020/058557, dated Apr. 29, 2021, 13 pages.
"Invitation to Pay Additional Fees and Partial Search Report", Application No. PCT/US2020/058487, dated Jan. 29, 2021, 11 pages.
Chen, et al., "Deep Learning With Edge Computing: A Review", Aug. 2019, 21 pages.
Dorner, et al., "Deep Learning-Based Communication Over the Air", Jul. 11, 2017, 11 pages.
Ferrus, et al., "Applicability Domains of Machine Learning in Next Generation Radio Access Networks", Dec. 2019, 8 pages.
Mismar, et al., "Deep Learning in Downlink Coordinated Multipoint in New Radio Heterogeneous Networks", Mar. 14, 2019, 4 pages.
Samarakoon, "Federated Learning for Ultra-Reliable Low-Latency V2V Communications", Dec. 9, 2018, 7 pages.
Ye, et al., "Deep Learning Based end-to-end Wireless Communication Systems Without Pilots", Feb. 23, 2021, 13 pages.
"3rd Generation Partnership Project; Technical Specification Group Services and System Aspects; Study on application architecture for enabling Edge Applications; (Release 17)", 3GPP TR 23.758 V17.0.0 (Dec. 2019), Dec. 2019, 113 pages.
"Foreign Office Action", European Application No. 19805861.2, dated Jul. 9, 2020, 7 pages.
"International Search Report and Written Opinion", PCT Application No. PCT/US2019/059094, dated Feb. 17, 2020, 16 pages.
"International Search Report and Written Opinion", PCT Application No. PCT/US2019/046546, dated Apr. 9, 2020, 13 pages.
"International Search Report and Written Opinion", PCT Application No. PCT/US2019/046535, dated May 20, 2020, 17 pages.
"International Search Report and Written Opinion", PCT Application No. PCT/US2019/049566, dated May 26, 2020, 13 pages.
Bonawitz, et al., "Towards Federated Learning at Scale: System Design", Proceedings of the 2nd SysML Conference, Palo Alto, CA, USA, 2019, 15 pages.
Huang, et al., "Deep Learning for Physical-Layer 5G Wireless Techniques: Opportunities, Challenges and Solutions", Jan. 23, 2019, 18 pages.
Jiang, et al., "Machine Learning Paradigms for Next-Generation Wireless Networks", Technical Report of Wireless Networking Group, Coordinated Science Laboratory, Dept. Electrical and Computer Engineering, University of Illinois, vol. 24, No. 2, Apr. 1, 2017, Apr. 1, 2017, 8 pages.
Kafle, et al., "Consideration on Automation of 5G Network Slicing with Machine Learning", 2018 ITU Kaleidoscope Academic Conference, Nov. 2018, 8 pages.
Klautau, et al., "5G MIMO Data for Machine Learning: Application to Beam-Selection Using Deep Learning", 2018 Information Theory and Applications Workshop (ITA), Feb. 1, 2018, Feb. 1, 2018, 9 pages.
Koo, et al., "Deep Reinforcement Learning for Network Slicing with Heterogeneous Resource Requirements and Time Varying Traffic Dynamics", Accessed online at: https://arxiv.org/pdf/1908.03242.pdf on Jul. 22, 2020, 9 pages.
Sun, et al., "Application of Machine Learning in Wireless Networks: Key Techniques and Open Issues", Accessed online at: https://arxiv.org/pdf/1809.08707.pdf on Jul. 22, 2020, Mar. 1, 2019, 34 pages.
Yao, et al., "Artificial Intelligence-Defined 5G Radio Access Networks", IEEE Communications Magazine, Mar. 2019, Mar. 2019, 7 pages.

\* cited by examiner

1800

Transmit a neural network table that includes a plurality of neural network formation configuration elements, each neural network formation configuration element of the plurality of neural network formation configuration elements configuring at least a portion of a deep neural network for processing communications transmitted over a wireless communication system.
1805

Select a neural network formation configuration elements from the plurality of neural network formation configurations elements to create a neural network formation configuration.
1810

Transmit an indication to a user equipment to direct the user equipment to form a deep neural network using the neural network formation configuration and to process the communications using the deep neural network.
1815

Fig. 18

BASE STATION-USER EQUIPMENT MESSAGING REGARDING DEEP NEURAL NETWORKS

BACKGROUND

The evolution of wireless communication systems oftentimes stems from a demand for data throughput. As one example, the demand for data increases as more and more devices gain access to the wireless communication system. Evolving devices also execute data-intensive applications that utilize more data than traditional applications, such as data-intensive streaming video applications, data-intensive social media applications, data-intensive audio services, etc. This increased demand can, at times, deplete the data resources of the wireless communication system. Thus, to accommodate increased data usage, evolving wireless communication systems utilize increasingly complex architectures as a way to provide more data throughput relative to legacy wireless communication systems.

As one example, fifth generation (5G) standards and technologies transmit data using higher frequency ranges, such as the above-6 Gigahertz (GHz) band, to increase data capacity. However, transmitting and recovering information using these higher frequency ranges poses challenges. To illustrate, higher frequency signals are more susceptible to multipath fading, scattering, atmospheric absorption, diffraction, interference, and so forth, relative to lower frequency signals. These signal distortions oftentimes lead to errors when recovering the information at a receiver. As another example, hardware capable of transmitting, receiving, routing, and/or otherwise using these higher frequencies can be complex and expensive, which increases the processing costs in a wirelessly-networked device.

SUMMARY

This document describes techniques and apparatuses for base station-user equipment messaging regarding deep neural networks (DNNs). In some aspects, a network entity determines a neural network (NN) formation configuration for a DNN for processing communications transmitted over a wireless communication system, where the NN formation configuration specifies any combination of neural network architecture configurations and/or parameter configurations as further described. The network entity, in implementations, generates a message that includes an indication of the NN formation configuration for the DNN. In turn, the network entity transmits the message to a user equipment to direct the user equipment to form the DNN using the neural network formation configuration and to process the communications transmitted over the wireless communication system using the DNN. By doing so, the network entity can monitor changing operating conditions in the wireless communication system and determine the DNN based on the changing operating conditions, thus improving information recovery in the wireless communication system.

Some aspects of communicating a neural network formation configuration (NN formation configuration) utilize a neural network table. A network entity in a wireless communication system transmits, to a user equipment, a neural network table that includes a plurality of NN formation configuration elements, each NN formation configuration element of the plurality of NN formation configuration elements configuring at least a portion of a DNN for processing communications transmitted over the wireless communication system. The network entity then selects one or more neural network formation configuration elements from the plurality of NN formation configuration elements to create a NN formation configuration, and transmits an indication to the user equipment to direct the user equipment to form a deep neural network using the neural network formation configuration and to process the communications using the deep neural network. In an example arrangement, the network entity determines index value(s) of the neural network table that corresponds to the selected NN formation configuration elements. In turn, the network entity transmits the index value(s) to the user equipment to direct the user equipment to form a DNN using the NN formation configuration and to process the communications using the DNN. By communicating a neural network table to a user equipment, the network entity can quickly reconfigure a DNN at the user equipment as operating conditions change, such as by transmitting an index value to the neural network table rather than transmitting individual parameter configurations, such as, by way of example and not of limitation, pooling parameter(s), kernel parameter(s), weights, and/or layer parameter(s), etc., to configure a DNN. This reduces data transmissions between the network entity and user equipment, improves the responsiveness of the user equipment, and improves information recovery in the wireless communication system.

In some aspects, a user equipment associated with a wireless communication system receives a message that indicates a NN formation configuration for a DNN for processing communications transmitted over the wireless communication system. In turn, the user equipment forms the DNN using the NN formation configuration indicated in the message. The user equipment receives the communications from a base station, and processes the communications using the DNN to extract information transmitted in the communications. By configuring the DNN based on input from a network entity, the user equipment can improve information recovery in the wireless communication system.

In some aspects, a user equipment in a wireless communication system receives a neural network table that includes a plurality of NN formation configuration elements that provide the user equipment with an ability to configure a DNN for processing communications transmitted over the wireless communication system. The user equipment receives a message that directs the user equipment to form the DNN using a NN formation configuration base on one or more neural network formation configuration elements in the plurality of NN formation configuration elements. The user equipment forms the DNN with the NN formation configuration by accessing the neural network table to obtain the one or more NN formation configuration elements, and processes the communications transmitted over the wireless communication system using the DNN. By receiving, storing, and accessing a neural network table to configure a DNN, the user equipment can quickly respond to directions to reconfigure the DNN and improve information recovery in the wireless communication system.

The details of one or more implementations of base station-user equipment messaging using DNNs, and communicating neural network formation configurations, are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of base station-user equipment messaging regarding deep neural networks and communicating neural network formation configurations are described below. The use of the same reference numbers in different instances in the description and the figures indicate similar elements:

FIGS. 9-1 and 9-2 illustrate an example transaction diagram between various devices for configuring a neural network using a neural network formation configuration.

FIGS. 16-1 and 16-2 illustrate an example environment for communicating neural network formation configurations using a set of candidate neural network formation configurations.

FIG. 18 illustrates an example method for communicating neural network formation configurations over a wireless communication system.

DETAILED DESCRIPTION

Figure 1:
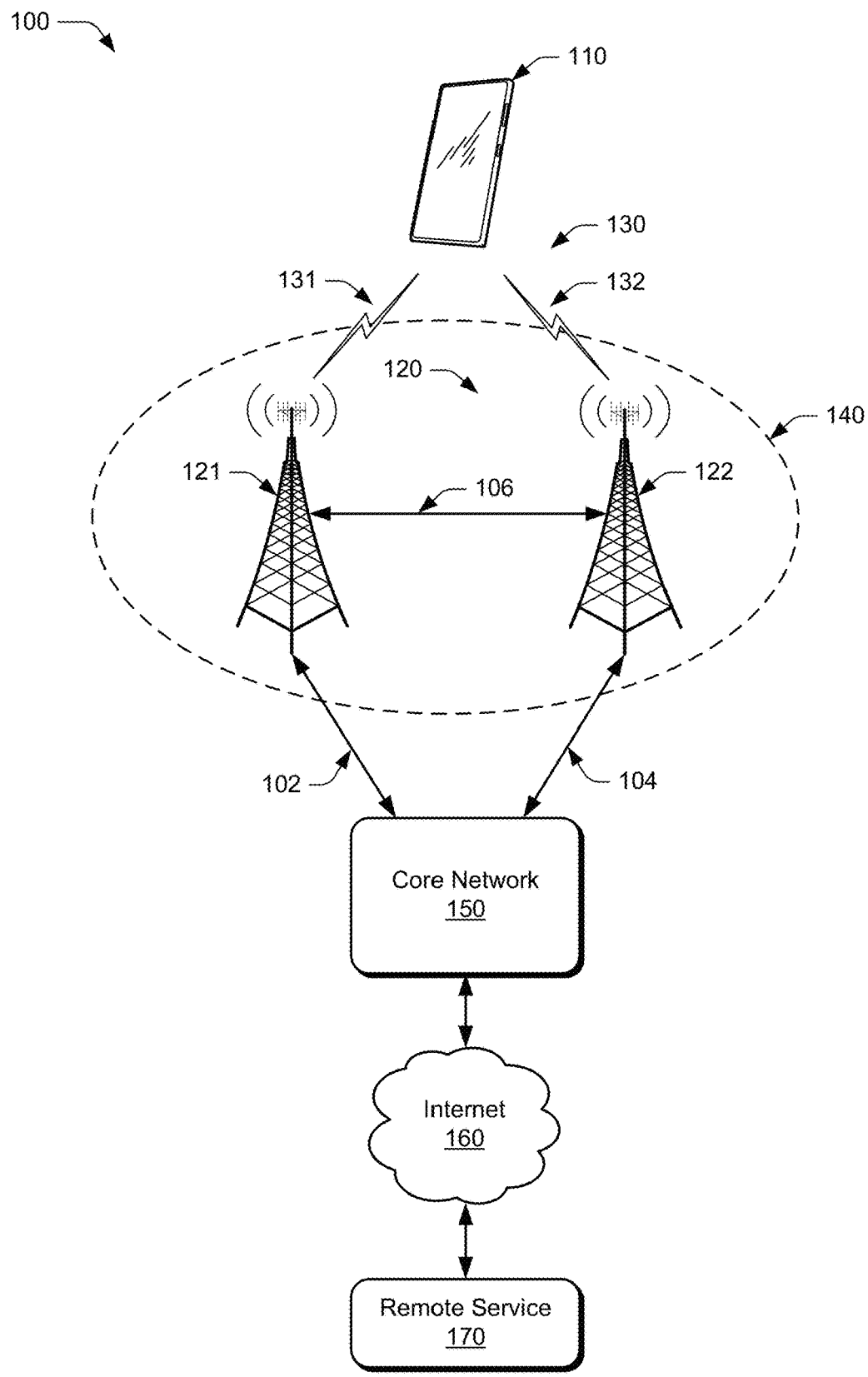
FIG. 1 illustrates an example environment in which various aspects of base station-user equipment messaging using deep neural networks can be implemented.

In conventional wireless communication systems, transmitter and receiver processing chains include complex functionality. For instance, a channel estimation block in the processing chain estimates or predicts how a transmission environment distorts a signal propagating through the transmission environment. As another example, channel equalizer blocks reverse the distortions identified by the channel estimation block from the signal. These complex functions oftentimes become more complicated when processing higher frequency ranges, such as 5G frequencies at or around the 6 GHz range. For instance, transmission environments add more distortion to the higher frequency ranges relative to lower frequency ranges, thus making information recovery more complex. As another example, hardware capable of processing and routing the higher frequency ranges oftentimes adds increased costs and complex physical constraints.

DNNs provide solutions to complex processing, such as the complex functionality used in a wireless communication system. By training a DNN on transmitter and/or receiver processing chain operations, the DNN can replace the conventional complex functionality in a variety of ways, such as by replacing some or all of the conventional processing blocks used in end-to-end processing of wireless communication signals, replacing individual processing chain blocks, etc. Dynamic reconfiguration of a DNN, such as by modifying various parameter configurations (e.g., coefficients, layer connections, kernel sizes) also provides an ability to adapt to changing operating conditions.

This document describes aspects of base station-user equipment messaging regarding DNNs, and communicating NN formation configurations, which may be used to process communications in a wireless communication system, and dynamically reconfigure the DNNs as operating conditions change. Aspects can be implemented by network entities that operate in the wireless communication system (e.g., a base station, a core network server, a user equipment).

For example, a network entity determines a NN formation configuration for a DNN for processing communications transmitted over the wireless communication system. Here, the phrase "transmitted over" includes generating communications to be transmitted over the wireless communication system (e.g. processing pre-transmission communications) and/or processing communications received over the wireless communication system. Thus, "processing communications transmitted over the wireless communication system" includes generating the transmissions, processing received transmissions, or any combination thereof. The network entity, in implementations, generates a message that includes an indication of the NN formation configuration for the DNN. The network entity then transmits the message to a user equipment to direct the user equipment to form the DNN using the NN formation configuration, and to process the communications transmitted over the wireless communication system using the DNN. By doing so, the network entity can monitor changing operating conditions in the wireless communication system, and update the neural networks based on the changing operating conditions, thus improving information recovery in the wireless communication system.

In some implementations, a network entity in a wireless communication system transmits, to a user equipment, a neural network table that includes a plurality of NN formation configuration elements, each NN formation configuration element of the plurality of NN formation configuration elements configuring at least a portion of a DNN for processing communications transmitted over the wireless communication system. The network entity then selects one or more neural network formation configuration elements from the plurality of neural network formation configuration elements to create a neural network formation configuration, and transmits an indication to the user equipment to direct the user equipment to form a DNN using the NN formation configuration and to process the communications using the DNN.

In an example arrangement, the network entity determines index value(s) of the neural network table that corresponds to the selected NN formation configuration elements. In turn, the network entity transmits the index value(s) to the user equipment to direct the user equipment to form a DNN using the NN formation configuration, and to process the communications using the DNN. By communicating a neural network table to a user equipment, the network entity can quickly reconfigure a DNN at the user equipment as operating conditions change, such as by transmitting an index value of the neural network table to the user equipment, rather than transmitting parameter configurations to reconfigure the DNN. This reduces data transmissions between the network entity and user equipment, improves the responsiveness of the user equipment, and improves information recovery in the wireless communication system.

In some aspects, a user equipment associated with a wireless communication system receives a message that indicates a NN formation configuration for a DNN for processing communications transmitted over the wireless communication system. In turn, the user equipment forms the DNN using the NN formation configuration indicated in the message. As the user equipment receives the communications from a base station, the user equipment extracts information transmitted in the communications by processing the communications using the DNN. By configuring the DNN based on input from the network entity, the user equipment can improve information recovery in the wireless communication system.

In some aspects, a user equipment in a wireless communication system receives a neural network table that includes a plurality of NN formation configuration elements that provide the user equipment with an ability to configure a DNN for processing communications transmitted over the wireless communication system. The user equipment receives a message that directs the user equipment to form the DNN using a NN formation configuration based on one or more NN formation configuration elements in the plurality of NN formation configuration elements. The user equipment then forms the DNN by accessing the neural network table to obtain the NN formation configuration (e.g., the NN formation configuration elements), and processes the communications transmitted over the wireless communication system using the DNN. By receiving, storing, and accessing the neural network table to configure the DNN, the user equipment can quickly respond to directions to reconfigure the DNN and improve information recovery in the wireless communication system.

Example Environments

FIG. 1 illustrates an example environment 100 which includes a user equipment 110 (UE 110) that can communicate with base stations 120 (illustrated as base stations 121 and 122) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, and the like, or any combination thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface, or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

Example Devices

Figure 2:
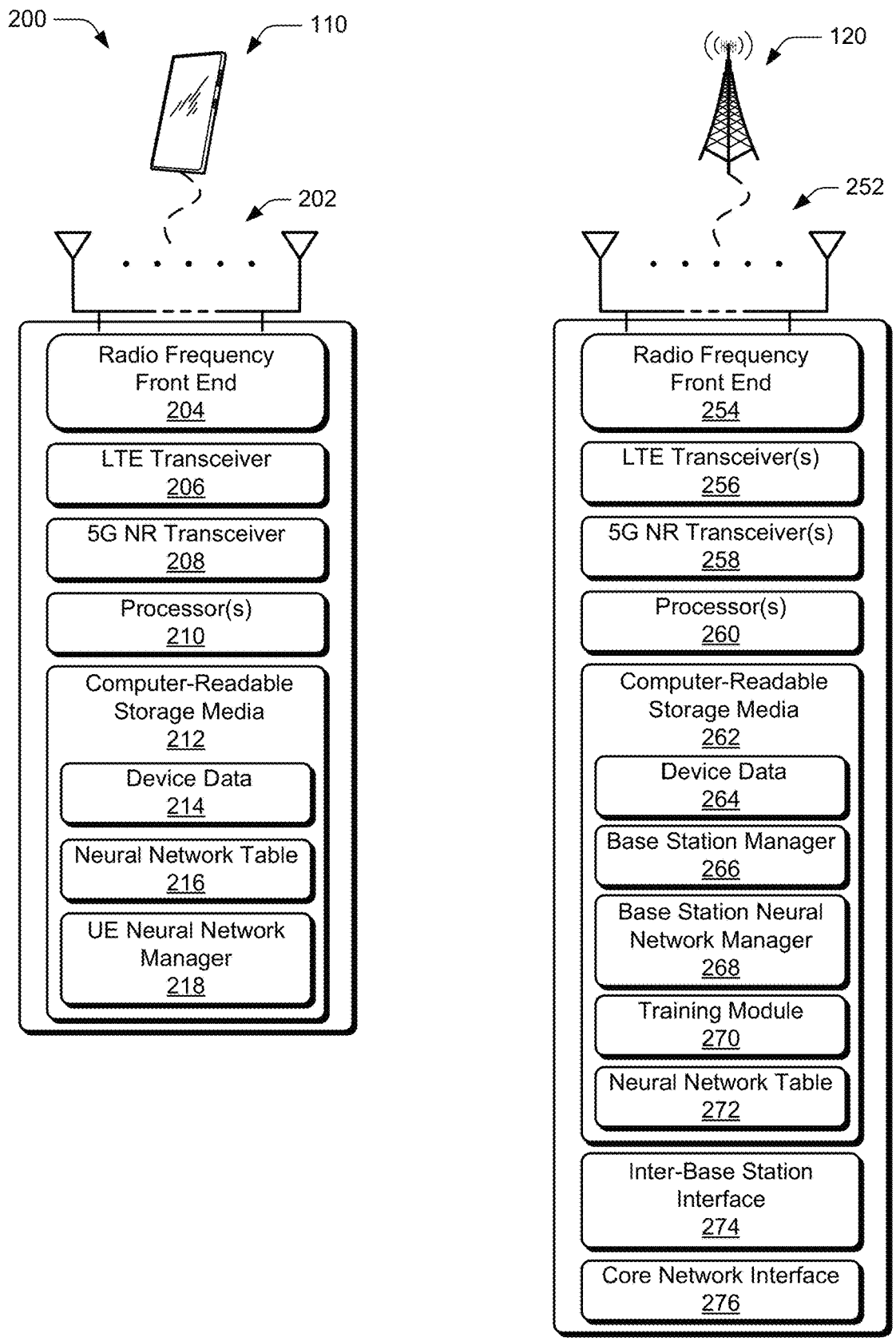
FIG. 2 illustrates an example device diagram of devices that can implement various aspects of base station-user equipment messaging using deep neural networks.
Figure 3:
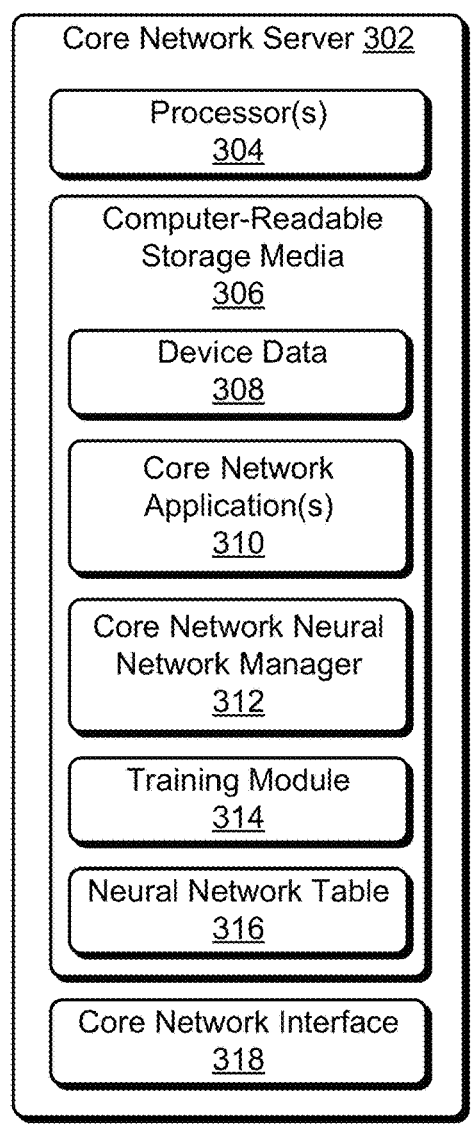
FIG. 3 illustrates an example device diagram of a device that can implement various aspects of base station-user equipment messaging using deep neural networks.

FIG. 2 illustrates an example device diagram 200 of the user equipment 110 and one of the base stations 120. FIG. 3 illustrates an example device diagram 300 of a core network server 302. The user equipment 110, the base station 120, and/or the core network server 302 may include additional functions and interfaces that are omitted from FIG. 2 or FIG. 3 for the sake of clarity.

The user equipment 110 includes antennas 202, a radio frequency front end 204 (RF front end 204), a wireless transceiver (e.g., an LTE transceiver 206, and/or a 5G NR transceiver 208) for communicating with the base station 120 in the RAN 140. The RF front end 204 of the user equipment 110 can couple or connect the LTE transceiver 206, and the 5G NR transceiver 208 to the antennas 202 to facilitate various types of wireless communication. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base station 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The user equipment 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, neural network tables, and/or an operating system of the user equipment 110, which are executable by processor(s) 210 to enable user-plane communication, control-plane signaling, and user interaction with the user equipment 110.

In some implementations, the computer-readable storage media 212 includes a neural network table 216 that stores various architecture and/or parameter configurations that form a neural network, such as, by way of example and not of limitation, parameters that specify a fully connected layer neural network architecture, a convolutional layer neural network architecture, a recurrent neural network layer, a number of connected hidden neural network layers, an input layer architecture, an output layer architecture, a number of nodes utilized by the neural network, coefficients (e.g., weights and biases) utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly, the neural network table 216 includes any combination of NN formation configuration elements (e.g., architecture and/or parameter configurations) that can be used to create a NN formation configuration (e.g., a combination of one or more NN formation configuration elements) that defines and/or forms a DNN. In some implementations, a single index value of the neural network table 216 maps to a single NN formation configuration element (e.g., a 1:1 correspondence). Alternately or additionally, a single index value of the neural network table 216 maps to a NN formation configuration (e.g., a combination of NN formation configuration elements). In some implementations, the neural network table includes input characteristics for each NN formation configuration element and/or NN formation configuration, where the input characteristics describe properties about the training data used to generate the NN formation configuration element and/or NN formation configuration as further described.

In some implementations, the CRM 212 may also include a user equipment neural network manager 218 (UE neural network manager 218). Alternately or additionally, the UE neural network manager 218 may be implemented in whole or part as hardware logic or circuitry integrated with or separate from other components of the user equipment 110. The UE neural network manager 218 accesses the neural network table 216, such as by way of an index value, and forms a DNN using the NN formation configuration elements specified by a NN formation configuration. In implementations, UE neural network manager forms multiple DNNs to process wireless communications (e.g., downlink communications and/or uplink communications exchanged with the base station 120).

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 include antennas 252, a radio frequency front end 254 (RF front end 254), one or more wireless transceivers (e.g. one or more LTE transceivers 256, and/or one or more 5G NR transceivers 258) for communicating with the UE 110. The RF front end 254 of the base station 120 can couple or connect the LTE transceivers 256 and the 5G NR transceivers 258 to the antennas 252 to facilitate various types of wireless communication. The antennas 252 of the base station 120 may include an array of multiple antennas that are configured similar to, or different from, each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base station 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station 120. The device data 264 includes network scheduling data, radio resource management data, beamforming codebooks, applications, and/or an operating system of the base station 120, which are executable by processor(s) 260 to enable communication with the user equipment 110.

CRM 262 also includes a base station manager 266. Alternately or additionally, the base station manager 266 may be implemented in whole or part as hardware logic or circuitry integrated with or separate from other components of the base station 120. In at least some aspects, the base station manager 266 configures the LTE transceivers 256 and the 5G NR transceivers 258 for communication with the user equipment 110, as well as communication with a core network, such as the core network 150.

CRM 262 also includes a base station neural network manager 268 (BS neural network manager 268). Alternately or additionally, the BS neural network manager 268 may be implemented in whole or part as hardware logic or circuitry integrated with or separate from other components of the base station 120. In at least some aspects, the BS neural network manager 268 selects the NN formation configurations utilized by the base station 120 and/or UE 110 to configure deep neural networks for processing wireless communications, such as by selecting a combination of NN formation configuration elements. In some implementations, the BS neural network manager receives feedback from the UE 110, and selects the neural network formation configuration based on the feedback. Alternately or additionally, the BS neural network manager 268 receives neural network formation configuration directions from core network 150 elements through a core network interface 276 or an inter-base station interface 274 and forwards the neural network formation configuration directions to UE 110.

CRM 262 includes training module 270 and neural network table 272. In implementations, the base station 120 manage and deploy NN formation configurations to UE 110. Alternately or additionally, the base station 120 maintain the neural network table 272. The training module 270 teaches and/or trains DNNs using known input data. For instance, the training module 270 trains DNN(s) for different purposes, such as processing communications transmitted over a wireless communication system (e.g., encoding downlink communications, modulating downlink communications, demodulating downlink communications, decoding downlink communications, encoding uplink communications, modulating uplink communications, demodulating uplink communications, decoding uplink communications). This includes training the DNN(s) offline (e.g., while the DNN is not actively engaged in processing the communications) and/or online (e.g., while the DNN is actively engaged in processing the communications).

In implementations, the training module 270 extracts learned parameter configurations from the DNN to identify the NN formation configuration elements and/or NN formation configuration, and then adds and/or updates the NN formation configuration elements and/or NN formation configuration in the neural network table 272. The extracted parameter configurations include any combination of information that defines the behavior of a neural network, such as node connections, coefficients, active layers, weights, biases, pooling, etc.

The neural network table 272 stores multiple different NN formation configuration elements and/or NN formation configurations generated using the training module 270. In some implementations, the neural network table includes input characteristics for each NN formation configuration element and/or NN formation configuration, where the input characteristics describe properties about the training data used to generate the NN formation configuration element and/or NN formation configuration. For instance, the input characteristics includes, by way of example and not of limitation, power information, signal-to-interference-plus-noise ratio (SINR) information, channel quality indicator (CQI) information, channel state information (CSI), Doppler feedback, frequency bands, BLock Error Rate (BLER), Quality of Service (QoS), Hybrid Automatic Repeat reQuest (HARQ) information (e.g., first transmission error rate, second transmission error rate, maximum retransmissions), latency, Radio Link Control (RLC), Automatic Repeat reQuest (ARQ) metrics, received signal strength (RSS), uplink SINR, timing measurements, error metrics, UE capabilities, BS capabilities, power mode, Internet Protocol (IP) layer throughput, end2end latency, end2end packet loss ratio, etc. Accordingly, the input characteristics include, at times, Layer 1, Layer 2, and/or Layer 3 metrics. In some implementations, a single index value of the neural network table 272 maps to a single NN formation configuration element (e.g., a 1:1 correspondence). Alternately or additionally, a single index value of the neural network table 272 maps to a NN formation configuration (e.g., a combination of NN formation configuration elements).

In implementations, the base station 120 synchronizes the neural network table 272 with the neural network table 216 such that the NN formation configuration elements and/or input characteristics stored in one neural network table is replicated in the second neural network table. Alternately or additionally, the base station 120 synchronizes the neural network table 272 with the neural network table 216 such that the NN formation configuration elements and/or input characteristics stored in one neural network table represent complementary functionality in the second neural network table (e.g., NN formation configuration elements for transmitter path processing in the first neural network table, NN formation configuration elements for receiver path processing in the second neural network table).

The base station 120 also include an inter-base station interface 274, such as an Xn and/or X2 interface, which the base station manager 266 configures to exchange user-plane, control-plane, and other information between other base station 120, to manage the communication of the base station 120 with the user equipment 110. The base station 120 include a core network interface 276 that the base station manager 266 configures to exchange user-plane, control-plane, and other information with core network functions and/or entities.

In FIG. 3, the core network server 302 may provide all or part of a function, entity, service, and/or gateway in the core network 150. Each function, entity, service, and/or gateway in the core network 150 may be provided as a service in the core network 150, distributed across multiple servers, or embodied on a dedicated server. For example, the core network server 302 may provide the all or a portion of the services or functions of a User Plane Function (UPF), an Access and Mobility Management Function (AMF), a Serving Gateway (S-GW), a Packet Data Network Gateway (P-GW), a Mobility Management Entity (MME), an Evolved Packet Data Gateway (ePDG), and so forth. The core network server 302 is illustrated as being embodied on a single server that includes processor(s) 304 and computer-readable storage media 306 (CRM 306). The processor 304 may be a single core processor or a multiple core processor composed of a variety of materials, such as silicon, polysilicon, high-K dielectric, copper, and so on. CRM 306 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 308 of the core network server 302. The device data 308 includes data to support a core network function or entity, and/or an operating system of the core network server 302, which are executable by processor(s) 304.

CRM 306 also includes one or more core network applications 310, which, in one implementation, is embodied on CRM 306 (as shown). The one or more core network applications 310 may implement the functionality such as UPF, AMF, S-GW, P-GW, MME, ePDG, and so forth. Alternately or additionally, the one or more core network applications 310 may be implemented in whole or part as hardware logic or circuitry integrated with or separate from other components of the core network server 302.

CRM 306 also includes a core network neural network manager 312 that manages NN formation configurations used to process communications exchanged between UE 110 and the base stations 120. In some implementations, the core network neural network manager 312 analyzes various parameters, such as current signal channel conditions (e.g., as reported by base stations 120, as reported by other wireless access points, as reported by UEs 110 (via base stations or other wireless access points)), capabilities at base stations 120 (e.g., antenna configurations, cell configurations, MIMO capabilities, radio capabilities, processing capabilities), capabilities of UE 110 (e.g., antenna configurations, MIMO capabilities, radio capabilities, processing capabilities), and so forth. For example, the base stations 120 obtain the various parameters during the communications with the UE and forward the parameters to the core network neural network manager 312. The core network neural network manager selects, based on these parameters, a NN formation configuration that improves the accuracy of a DNN processing the communications. Improving the accuracy signifies an improved accuracy in the output, such as lower bit errors, generated by the neural network relative to a neural network configured with another NN formation configuration. The core network neural network manager 312 then communicates the selected NN formation configuration to the base stations 120 and/or the UE 110. In implementations, the core network neural network manager 312 receives UE and/or BS feedback from the base station 120 and selects an updated NN formation configuration based on the feedback.

CRM 306 includes training module 314 and neural network table 316. In implementations, the core network server 302 manages and deploys NN formation configurations to multiple devices in a wireless communication system, such as UEs 110 and base stations 120. Alternately or additionally, the core network server maintains the neural network table 316 outside of the CRM 306. The training module 314 teaches and/or trains DNNs using known input data. For instance, the training module 314 trains DNN(s) to process different types of pilot communications transmitted over a wireless communication system. This includes training the DNN(s) offline and/or online. In implementations, the training module 314 extracts a learned NN formation configuration and/or learned NN formation configuration elements from the DNN and stores the learned NN formation configuration elements in the neural network table 316. Thus, a NN formation configuration includes any combination of architecture configurations (e.g., node connections, layer connections) and/or parameter configurations (e.g., weights, biases, pooling) that define or influence the behavior of a DNN. In some implementations, a single index value of the neural network table 316 maps to a single NN formation configuration element (e.g., a 1:1 correspondence). Alternately or additionally, a single index value of the neural network table 316 maps to a NN formation configuration (e.g., a combination of NN formation configuration elements).

In some implementations, the training module 314 of the core network neural network manager 312 generates complementary NN formation configurations and/or NN formation configuration elements to those stored in the neural network table 216 at the UE 110 and/or the neural network table 272 at the base station 121. As one example, the training module 314 generates neural network table 316 with NN formation configurations and/or NN formation configuration elements that have a high variation in the architecture and/or parameter configurations relative to medium and/or low variations used to generate the neural network table 272 and/or the neural network table 216. For instance, the NN formation configurations and/or NN formation configuration elements generated by the training module 314 correspond to fully connected layers, a full kernel size, frequent sampling and/or pooling, high weighting accuracy, and so forth. Accordingly, the neural network table 316 includes, at times, high accuracy neural networks at the trade-off of increased processing complexity and/or time.

The NN formation configurations and/or NN formation configuration elements generated by the training module 270 have, at times, more fixed architecture and/or parameter configurations (e.g., fixed connection layers, fixed kernel size, etc.), and less variation, relative to those generated by the training module 314. The training module 270, for example, generates streamlined NN formation configurations (e.g., faster computation times, less data processing), relative to those generated by the training module 314, to optimize or improve a performance of end2end network communications at the base station 121 and/or the UE 110. Alternately or additionally, the NN formation configurations and/or NN formation configuration elements stored at the neural network table 216 at the UE 110 include more fixed architecture and/or parameter configurations, relative to those stored in the neural network table 316 and/or the neural network table 272, that reduce requirements (e.g., computation speed, less data processing points, less computations, less power consumption, etc.) at the UE 110 relative to the base station 121 and/or the core network server 302. In implementations, the variations in fixed (or flexible) architecture and/or parameter configurations at each neural network are based on the processing resources (e.g., processing capabilities, memory constraints, quantization constraints (e.g., 8-bit vs. 16-bit), fixed point vs floating point computations, power availability) of the devices targeted to form the corresponding DNNs. Thus, UEs or access points with less processing resources relative to a core network server or base station receive NN formation configurations optimized for the available processing resources.

The neural network table 316 stores multiple different NN formation configuration elements generated using the training module 314. In some implementations, the neural network table includes input characteristics for each NN formation configuration element and/or NN formation configuration, where the input characteristics describe properties about the training data used to generate the NN formation configuration. For instance, the input characteristics can include power information, SINR information, CQI, CSI, Doppler feedback, RSS, error metrics, minimum end2end (E2E) latency, desired E2E latency, E2E QoS, E2E throughput, E2E packet loss ratio, cost of service, etc.

The core network server 302 also includes a core network interface 318 for communication of user-plane, control-plane, and other information with the other functions or entities in the core network 150, base stations 120, or UE 110. In implementations, the core network server 302 communicates NN formation configurations to the base station 120 using the core network interface 318. The core network server 302 alternately or additionally receives feedback from the base stations 120 and/or the UE 110, by way of the base stations 120, using the core network interface 318.

Having described an example environment and example devices that can be utilized for base station-user equipment messaging using deep neural networks, consider now a discussion of configurable machine-learning modules that is in accordance with one or more implementations.

Configurable Machine-Learning Modules

Figure 4:
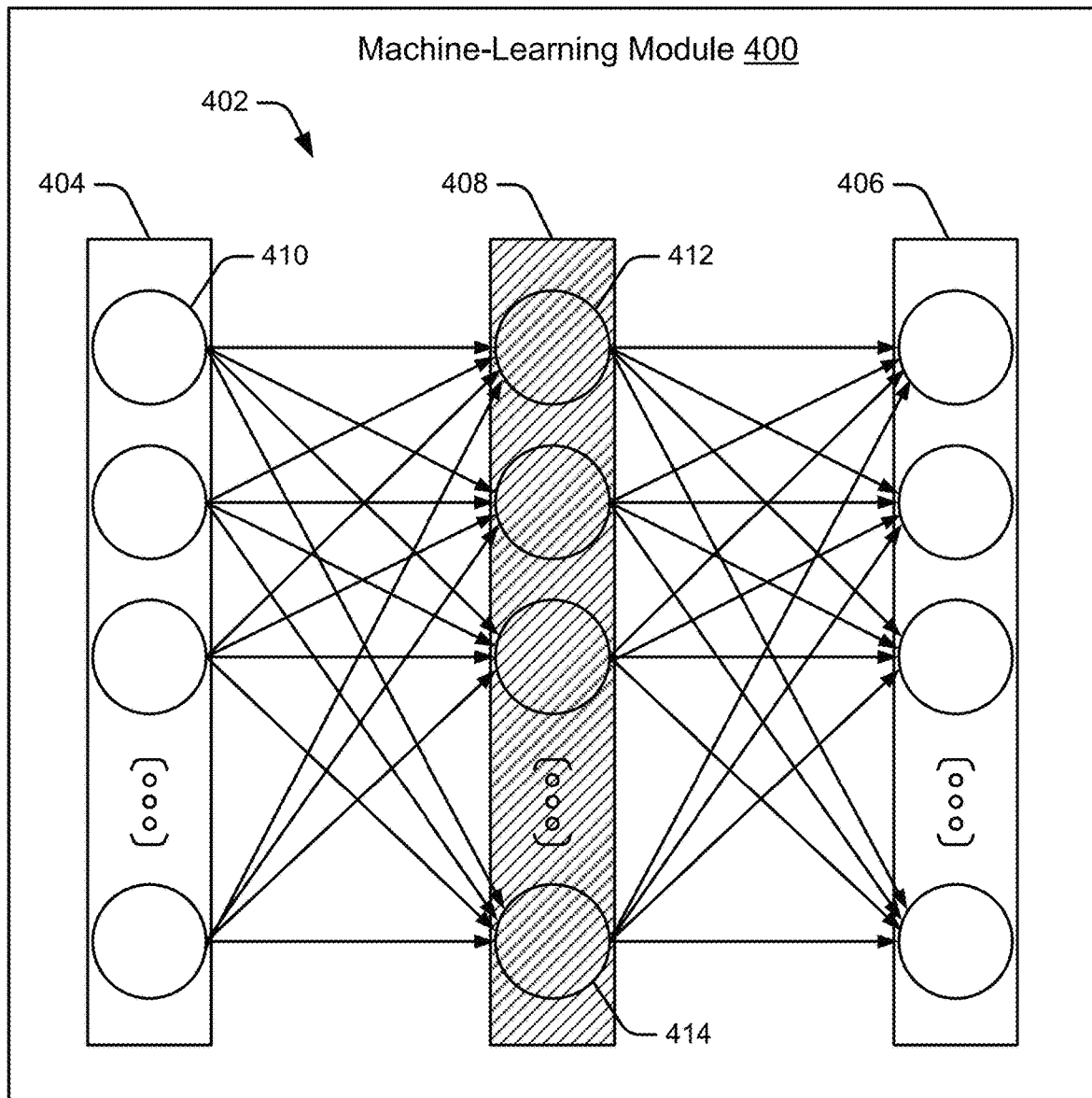
FIG. 4 illustrates an example machine-learning module that can implement various aspects of base station-user equipment messaging using deep neural networks.

FIG. 4 illustrates an example machine-learning module 400. The machine-learning module 400 implements a set of adaptive algorithms that learn and identify patterns within data. The machine-learning module 400 can be implemented using any combination of software, hardware, and/or firmware.

In FIG. 4, the machine-learning module 400 includes a deep neural network 402 (DNN 402) with groups of connected nodes (e.g., neurons and/or perceptrons) that are organized into three or more layers. The nodes between layers are configurable in a variety of ways, such as a partially-connected configuration where a first subset of nodes in a first layer are connected with a second subset of nodes in a second layer, a fully-connected configuration where each node in a first layer are connected to each node in a second layer, etc. A neuron processes input data to produce a continuous output value, such as any real number between 0 and 1. In some cases, the output value indicates how close the input data is to a desired category. A perceptron performs linear classifications on the input data, such as a binary classification. The nodes, whether neurons or perceptrons, can use a variety of algorithms to generate output information based upon adaptive learning. Using the DNN, the machine-learning module 400 performs a variety of different types of analysis, including single linear regression, multiple linear regression, logistic regression, step-wise regression, binary classification, multiclass classification, multi-variate adaptive regression splines, locally estimated scatterplot smoothing, and so forth.

In some implementations, the machine-learning module 400 adaptively learns based on supervised learning. In supervised learning, the machine-learning module receives various types of input data as training data. The machine-learning module processes the training data to learn how to map the input to a desired output. As one example, the machine-learning module 400 receives digital samples of a signal as input data and learns how to map the signal samples to binary data that reflects information embedded within the signal. As another example, the machine-learning module 400 receives binary data as input data and learns how to map the binary data to digital samples of a signal with the binary data embedded within the signal. During a training procedure, the machine-learning module 400 uses labeled or known data as an input to the DNN. The DNN analyzes the input using the nodes and generates a corresponding output. The machine-learning module 400 compares the corresponding output to truth data and adapts the algorithms implemented by the nodes to improve the accuracy of the output data. Afterwards, the DNN applies the adapted algorithms to unlabeled input data to generate corresponding output data.

The machine-learning module 400 uses statistical analyses and/or adaptive learning to map an input to an output. For instance, the machine-learning module 400 uses characteristics learned from training data to correlate an unknown input to an output that is statistically likely within a threshold range or value. This allows the machine-learning module 400 to receive complex input and identify a corresponding output. Some implementations train the machine-learning module 400 on characteristics of communications transmitted over a wireless communication system (e.g., time/frequency interleaving, time/frequency deinterleaving, convolutional encoding, convolutional decoding, power levels, channel equalization, inter-symbol interference, quadrature amplitude modulation/demodulation, frequency-division multiplexing/de-multiplexing, transmission channel characteristics). This allows the trained machine-learning module 400 to receive samples of a signal as an input, such as samples of a downlink signal received at a user equipment, and recover information from the downlink signal, such as the binary data embedded in the downlink signal.

In FIG. 4, the DNN includes an input layer 404, an output layer 406, and one or more hidden layer(s) 408 that are positioned between the input layer and the output layer. Each layer has an arbitrary number of nodes, where the number of nodes between layers can be the same or different. In other words, input layer 404 can have a same number and/or different number of nodes as output layer 406, output layer 406 can have a same number and/or different number of nodes than hidden layer(s) 408, and so forth.

Node 410 corresponds to one of several nodes included in input layer 404, where the nodes perform independent computations from one another. As further described, a node receives input data, and processes the input data using algorithm(s) to produce output data. At times, the algorithm(s) include weights and/or coefficients that change based on adaptive learning. Thus, the weights and/or coefficients reflect information learned by the neural network. Each node can, in some cases, determine whether to pass the processed input data to the next node(s). To illustrate, after processing input data, node 410 can determine whether to pass the processed input data to node 412 and/or node 414 of hidden layer(s) 408. Alternately or additionally, node 410 passes the processed input data to nodes based upon a layer connection architecture. This process can repeat throughout multiple layers until the DNN generates an output using the nodes of output layer 406.

A neural network can also employ a variety of architectures that determine what nodes within the neural network are connected, how data is advanced and/or retained in the neural network, what weights and coefficients are used to process the input data, how the data is processed, and so forth. These various factors collectively describe a NN formation configuration. To illustrate, a recurrent neural network, such as a long short-term memory (LSTM) neural network, forms cycles between node connections in order to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, it is to be appreciated that the NN formation configuration can include a variety of parameter configurations that influence how the neural network processes input data.

A NN formation configuration of a neural network can be characterized by various architecture and/or parameter configurations. To illustrate, consider an example in which the DNN implements a convolutional neural network. Generally, a convolutional neural network corresponds to a type of DNN in which the layers process data using convolutional operations to filter the input data. Accordingly, the convolutional NN formation configuration can be characterized with, by way of example and not of limitation, pooling parameter(s), kernel parameter(s), weights, and/or layer parameter(s).

A pooling parameter corresponds to a parameter that specifies pooling layers within the convolutional neural network that reduce the dimensions of the input data. To illustrate, a pooling layer can combine the output of nodes at a first layer into a node input at a second layer. Alternately or additionally, the pooling parameter specifies how and where in the layers of data processing the neural network pools data. A pooling parameter that indicates "max pooling," for instance, configures the neural network to pool by selecting a maximum value from the grouping of data generated by the nodes of a first layer, and use the maximum value as the input into the single node of a second layer. A pooling parameter that indicates "average pooling" configures the neural network to generate an average value from the grouping of data generated by the nodes of the first layer and use the average value as the input to the single node of the second layer.

A kernel parameter indicates a filter size (e.g., a width and height) to use in processing input data. Alternately or additionally, the kernel parameter specifies a type of kernel method used in filtering and processing the input data. A support vector machine, for instance, corresponds to a kernel method that uses regression analysis to identify and/or classify data. Other types of kernel methods include Gaussian processes, canonical correlation analysis, spectral clustering methods, and so forth. Accordingly, the kernel parameter can indicate a filter size and/or a type of kernel method to apply in the neural network.

Weight parameters specify weights and biases used by the algorithms within the nodes to classify input data. In implementations, the weights and biases are learned parameter configurations, such as parameter configurations generated from training data.

A layer parameter specifies layer connections and/or layer types, such as a fully-connected layer type that indicates to connect every node in a first layer (e.g., output layer 406) to every node in a second layer (e.g., hidden layer(s) 408), a partially-connected layer type that indicates which nodes in the first layer to disconnect from the second layer, an activation layer type that indicates which filters and/or layers to activate within the neural network, and so forth. Alternately or additionally, the layer parameter specifies types of node layers, such as a normalization layer type, a convolutional layer type, a pooling layer type, etc.

While described in the context of pooling parameters, kernel parameters, weight parameters, and layer parameters, it is to be appreciated that other parameter configurations can be used to form a DNN without departing from the scope of the claimed subject matter. Accordingly, a NN formation configuration can include any suitable type of configuration parameter that can be applied to a DNN that influences how the DNN processes input data to generate output data.

Some implementations configure machine-learning module 400 based on a current operating environment. To illustrate, consider a machine-learning module trained to generate binary data from digital samples of a signal. A transmission environment oftentimes modifies the characteristics of a signal traveling through the environment. Transmission environments oftentimes change, which impacts how the environment modifies the signal. A first transmission environment, for instance, modifies a signal in a first manner, while a second transmission environment modifies the signal in a different manner than the first. These differences impact an accuracy of the output results generated by a machine-learning module. For instance, a neural network configured to process communications transmitted over the first transmission environment may generate errors when processing communications transmitted over the second transmission environment (e.g., bit errors that exceed a threshold value).

Various implementations generate and store NN formation configurations and/or NN formation configuration elements (e.g., various architecture and/or parameter configurations) for different transmission environments. Base stations 120 and/or core network server 302, for example, train the machine-learning module 400 using any combination of BS neural network manager 268, training module 270, core network neural network manager 312, and/or training module 314. The training can occur offline when no active communication exchanges are occurring, or online during active communication exchanges. For example, the base stations 120 and/or core network server 302 can mathematically generate training data, access files that store the training data, obtain real-world communications data, etc. The base stations 120 and/or core network server 302 then extract and store the various learned NN formation configurations in a neural network table. Some implementations store input characteristics with each NN formation configuration, where the input characteristics describe various properties of the transmission environment corresponding to the respective NN formation configuration. In implementations, a neural network manager selects a NN formation configuration and/or NN formation configuration element(s) by matching a current transmission environment and/or current operating environment to the input characteristics.

Having described configurable machine-learning modules, consider now a discussion of deep neural networks in wireless communication systems that is in accordance with one or more implementations.

Deep Neural Networks in Wireless Communication Systems

Wireless communication systems include a variety of complex components and/or functions, such as the various devices and modules described with reference to the example environment 100 of FIG. 1, the example device diagram 200 of FIG. 2, and the example device diagram 300 of FIG. 3. In some implementations, the devices participating in the wireless communication system chain together a series of functions to enable the exchange of information over wireless connections.

Figure 5:
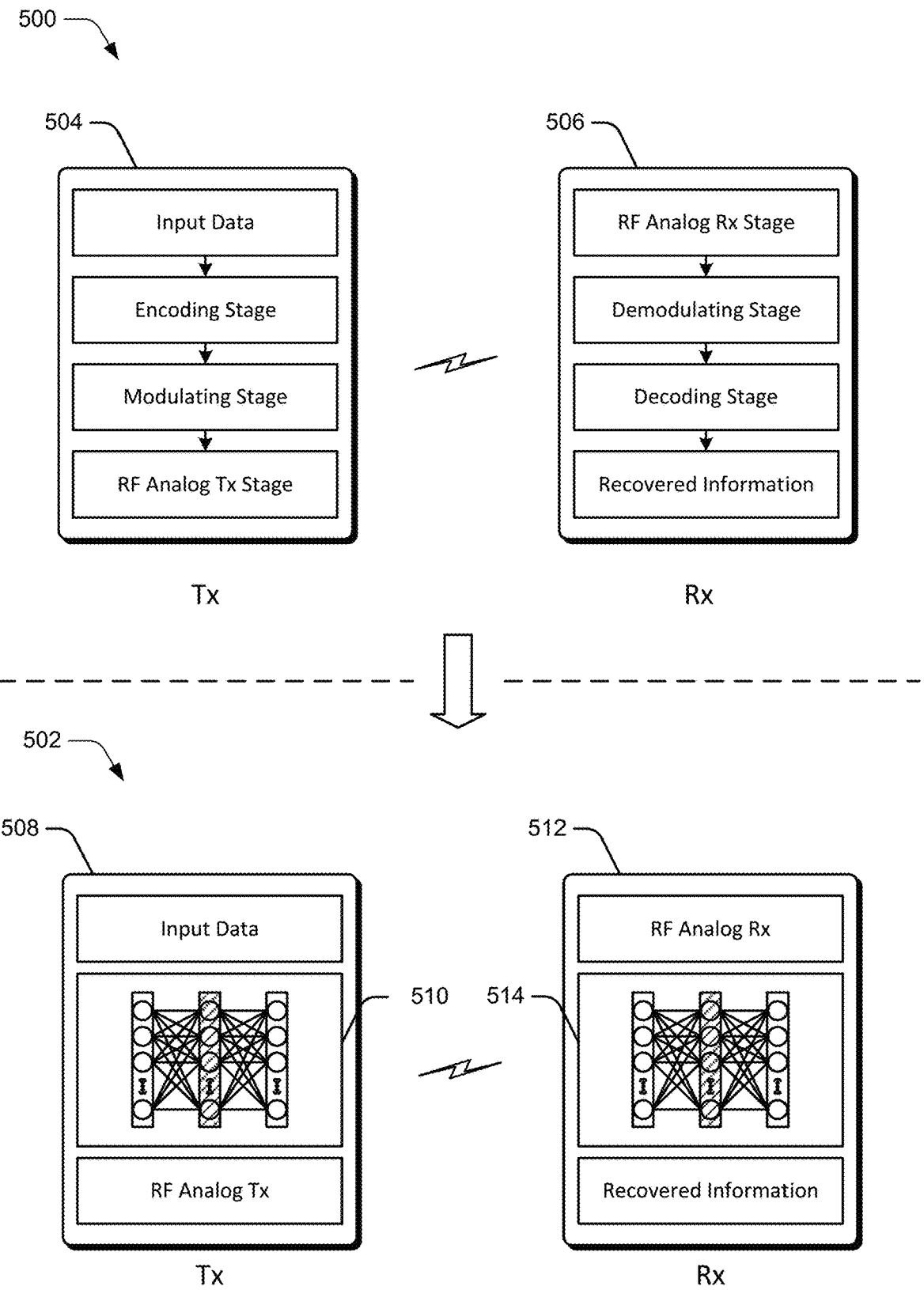
FIG. 5 illustrates example block diagrams of processing chains utilized by devices to process communications transmitted over a wireless communication system.

To demonstrate, consider now FIG. 5 that illustrates example block diagram 500 and example block diagram 502, each of which depicts an example processing chain utilized by devices in a wireless communication system. For simplicity, the block diagrams illustrate high-level functionality, and it is to be appreciated that the block diagrams may include additional functions that are omitted from FIG. 5 for the sake of clarity.

In the upper portion of FIG. 5, block diagram 500 includes a transmitter block 504 and a receiver block 506. Transmitter block 504 includes a transmitter processing chain that progresses from top to bottom. The transmitter processing chain begins with input data that progresses to an encoding stage, followed by a modulating stage, and then a radio frequency (RF) analog transmit (Tx) stage. The encoding stage can include any type and number of encoding stages employed by a device to transmit data over the wireless communication system.

To illustrate, an example encoding stage receives binary data as input, and processes the binary data using various encoding algorithms to append information to the binary data, such as frame information. Alternately or additionally, the encoding stage transforms the binary data, such as by applying forward error correction that adds redundancies to help information recovery at a receiver. As another example, the encoding stage converts the binary data into symbols.

An example modulating stage receives an output generated by the encoding stage as input and embeds the input onto a signal. For instance, the modulating stage generates digital samples of signal(s) embedded with the input from the encoding stage. Thus, in transmitter block 504, the encoding stage and the modulating stage represent a high-level transmitter processing chain that oftentimes includes lower-level complex functions, such as convolutional encoding, serial-to-parallel conversion, cyclic prefix insertion, channel coding, time/frequency interleaving, and so forth. The RF analog Tx stage receives the output from the modulating stage, generates an analog RF signal based on the modulating stage output, and transmits the analog RF signal to receiver block 506.

Receiver block 506 performs complementary processing relative to transceiver block 504 using a receiver processing chain. The receiver processing chain illustrated in receiver block 506 progresses from top to bottom and includes an RF analog receive (Rx) stage, followed by a demodulating stage, and a decoding stage.

The RF analog Rx stage receives signals transmitted by the transmitter block 504, and generates an input used by the demodulating stage. As one example, the RF analog Rx stage includes a down-conversion component and/or an analog-to-digital converter (ADC) to generate samples of the received signal. The demodulating stage processes input from the RF analog Rx stage to extract data embedded on the signal (e.g., data embedded by the modulating stage of the transmitter block 504). The demodulating stage, for instance, recovers symbols and/or binary data.

The decoding stage receives input from the demodulating stage, such as recovered symbols and/or binary data, and processes the input to recover the transmitted information. To illustrate, the decoding stage corrects for data errors based on forward error correction applied at the transmitter block, extracts payload data from frames and/or slots, and so forth. Thus, the decoding stage generates the recovered information.

As noted, the transmitter and receiver processing chains illustrated by transmitter block 504 and receiver block 506 have been simplified for clarity and can include multiple complex modules. At times, these complex modules are specific to particular functions and/or conditions. Consider, for example, a receiver processing chain that processes Orthogonal Frequency Division Modulation (OFDM) transmissions. To recover information from OFDM transmissions, the receiver block oftentimes includes multiple processing blocks, each of which is dedicated to a particular function, such as an equalization block that corrects for distortion in a received signal, a channel estimation block that estimates transmission channel properties to identify the effects of scattering, power decay, and so forth, on a transmission, etc. At high frequencies, such as frequencies in the 6 GHz band, these blocks can be computationally and/or monetarily expensive (e.g., require substantial processing power, require expensive hardware). Further, implementing blocks that generate outputs with an accuracy within a desired threshold oftentimes requires more specific and less flexible components. To illustrate, an equalization block that functions for signals in the 6 GHz band may not perform with the same accuracy at other frequency bands, thus necessitating different equalization blocks for different bands and adding complexity to the corresponding devices.

Some implementations include DNNs in the transmission and/or receiver processing chains. In block diagram 502, transmitter block 508 includes one or more deep neural network(s) 510 (DNNs 510) in the transmitter processing chain, while receiver block 512 includes one or more deep neural network(s) 514 (DNNs 514) in the receiver processing chain.

For simplicity, the DNNs 510 in the transmitter block 508 correspond to the encoding stage and the modulating stage of transmitter block 504. It is to be appreciated, however, that the DNNs can perform any high-level and/or low-level operation found within the transmitter processing chain. For instance, a first DNN performs low-level transmitter-side forward error correction, a second DNN performs low-level transmitter-side convolutional encoding, and so forth. Alternately or additionally, the DNNs 510 perform high-level processing, such as end-to-end processing that corresponds to the encoding stage and the modulating stage of transmitter block 508.

In a similar manner, the DNNs 514 in receiver block 512 perform receiver processing chain functionality (e.g., demodulating stage, decoding stage). The DNNs 514 can perform any high-level and/or low-level operation found within the receiver processing chain, such as low-level receiver-side bit error correction, low-level receiver-side symbol recovery, high-level end-to-end demodulating and decoding, etc. Accordingly, DNNs in wireless communication systems can be configured to replace high-level operations and/or low-level operations in transmitter and receiver processing chains. At times, the DNNs performing the high-level operations and/or low-level operations can be configured and/or reconfigured based on a current operating environment as further described. This provides more flexibility and adaptability to the processing chains relative to the more specific and less flexible components.

Some implementations process communication exchanges over the wireless communication system using multiple DNNs, where each DNN has a respective purpose (e.g., uplink processing, downlink processing, uplink encoding processing, downlink decoding processing, etc.). To demonstrate, consider now FIG. 6 that illustrates an example operating environment 600 that includes UE 110 and base station 121. The UE 110 and base station 121 exchange communications with one another over a wireless communication system by processing the communications using multiple DNNs.

Figure 6:
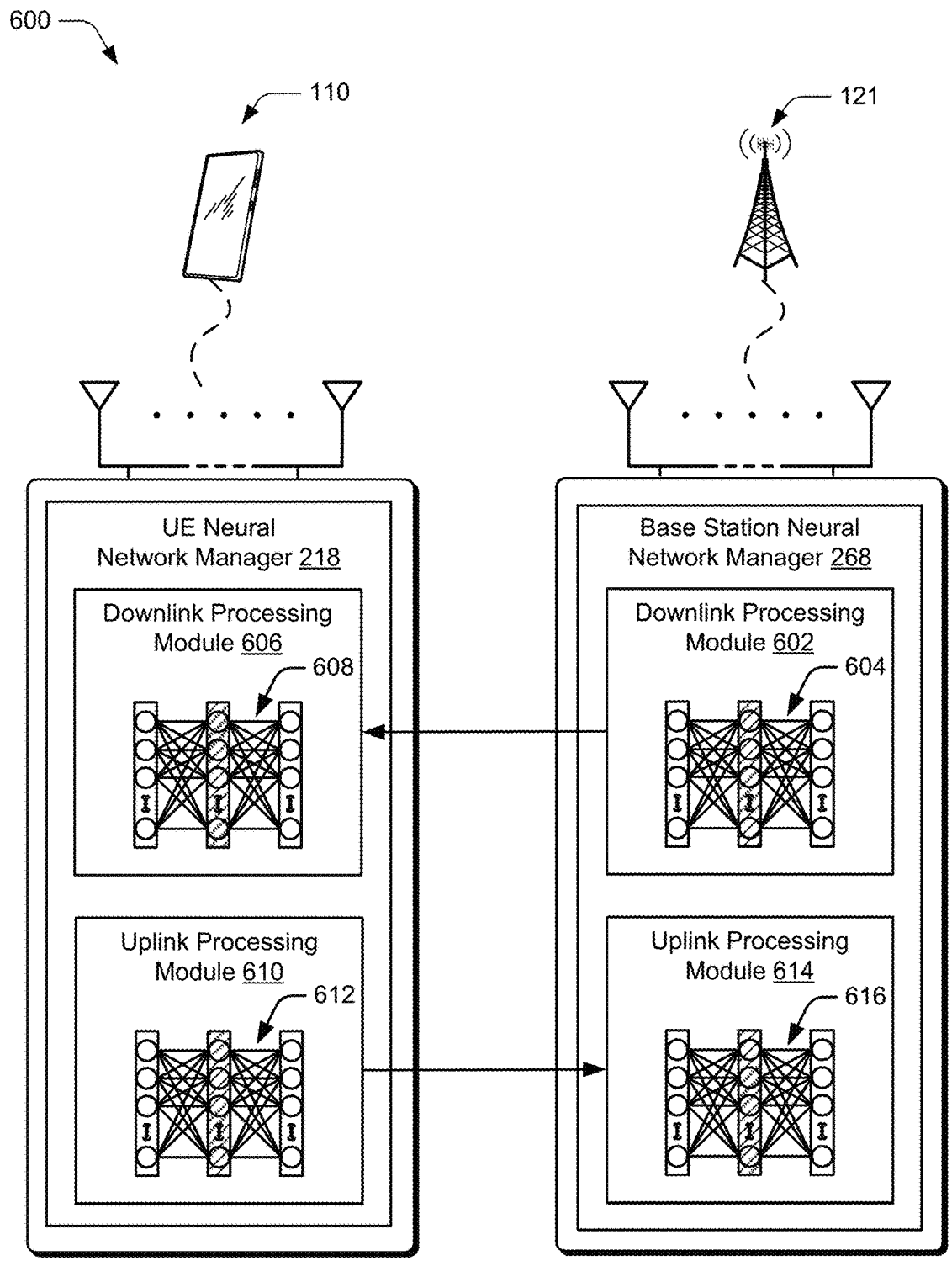
FIG. 6 illustrates an example operating environment in which multiple deep neural networks are utilized in a wireless communication system.

In FIG. 6, the base station neural network manager 268 of the base station 121 includes a downlink processing module 602 for processing downlink communications, such as for generating downlink communications transmitted to the UE 110. To illustrate, the base station neural network manager 268 forms deep neural network(s) 604 (DNNs 604) in the downlink processing module 602 using NN formation configurations as further described. In some examples, the DNNs 604 correspond to the DNNs 510 of FIG. 5. In other words, the DNNs 604 perform some or all of the transmitter processing functionality used to generate downlink communications.

Similarly, the UE neural network manager 218 of the UE 110 includes a downlink processing module 606, where the downlink processing module 606 includes deep neural network(s) 608 (DNNs 608) for processing (received) downlink communications. In various implementations, the UE neural network manager 218 forms the DNNs 608 using NN formation configurations. In FIG. 6, the DNNs 608 correspond to the DNNs 514 of FIG. 5, where the deep neural network(s) 606 of UE 110 perform some or all receiver processing functionality for (received) downlink communications. Accordingly, the DNNs 604 and the DNNs 608 perform complementary processing to one another (e.g., encoding/decoding, modulating/demodulating).

The DNNs 604 and/or DNNs 608 can include multiple deep neural networks, where each DNN is dedicated to a respective channel, a respective purpose, and so forth. The base station 121, as one example, processes downlink control channel information using a first DNN of the DNNs 604, processes downlink data channel information using a second DNN of the DNNs 604, and so forth. As another example, the UE 110 processes downlink control channel information using a first DNN of the DNNs 608, processes downlink data channel information using a second DNN of the DNNs 608, etc.

The base station 121 and/or the UE 110 also process uplink communications using DNNs. In environment 600, the UE neural network manager 218 includes an uplink processing module 610, where the uplink processing module 610 includes deep neural network(s) 612 (DNNs 612) for generating and/or processing uplink communications (e.g., encoding, modulating). In other words, uplink processing module 610 processes pre-transmission communications as part of processing the uplink communications. The UE neural network manager 218, for example, forms the DNNs 612 using NN formation configurations. At times, the DNNs 612 correspond to the DNNs 510 of FIG. 5. Thus, the DNNs 612 perform some or all of the transmitter processing functionality used to generate uplink communications transmitted from the UE 110 to the base station 121.

Similarly, uplink processing module 614 of the base station 121 includes deep neural network(s) 616 (DNNs 616) for processing (received) uplink communications, where base station neural network manager 268 forms DNNs 616 using NN formation configurations as further described. In examples, the DNNs 616 of the base station 121 correspond to the DNNs 514 of FIG. 5, and perform some or all receiver processing functionality for (received) uplink communications, such as uplink communications received from UE 110. At times, the DNNs 612 and the DNNs 616 perform complementary functionality of one another. Alternately or additionally, the uplink processing module 610 and/or the uplink processing module 614 include multiple DNNs, where each DNN has a dedicated purpose (e.g., processes a respective channel, performs respective uplink functionality, and so forth). FIG. 6 illustrates the DNNs 604, 608, 612, and 616 as residing within the respective neural network managers to signify that the neural network managers form the DNNs, and it is to be appreciated that the DNNs can be formed external to the neural network managers (e.g., UE neural network manager 218 and base station neural network manager 268) within different components, processing chains, modules, etc.

Having described deep neural networks in wireless communication systems, consider now a discussion of signal and control transactions over a wireless communication system that can be used to configure deep neural networks for downlink and uplink communications that is in accordance with one or more implementations.

Signaling and Control Transactions to Configure Deep Neural Networks

Figure 7:
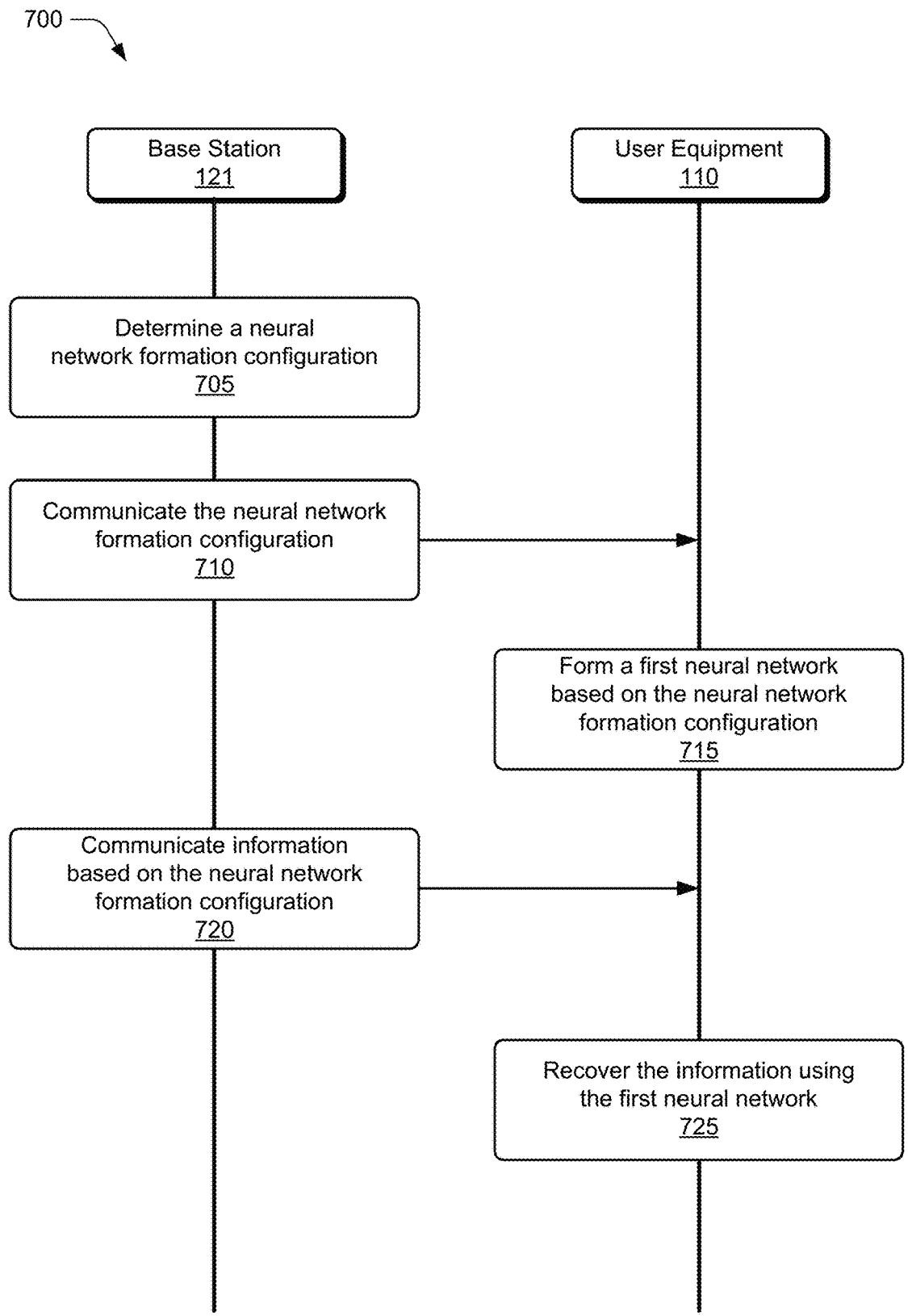
FIG. 7 illustrates an example transaction diagram between various devices for configuring a neural network using a neural network formation configuration.
Figure 8:
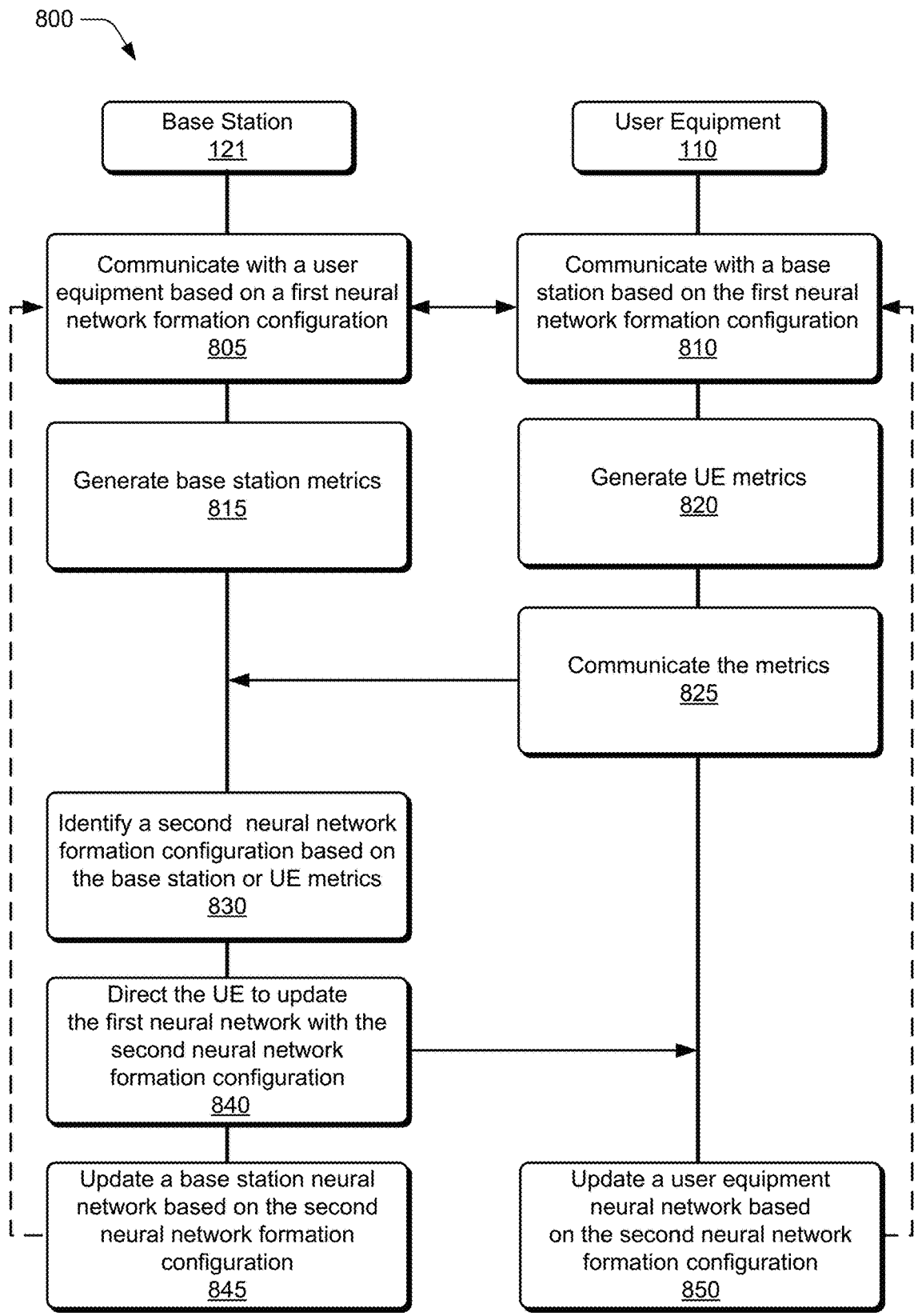
FIG. 8 illustrates an example transaction diagram between various devices for updating a neural network using a neural network formation configuration.
Figures 1, 9:
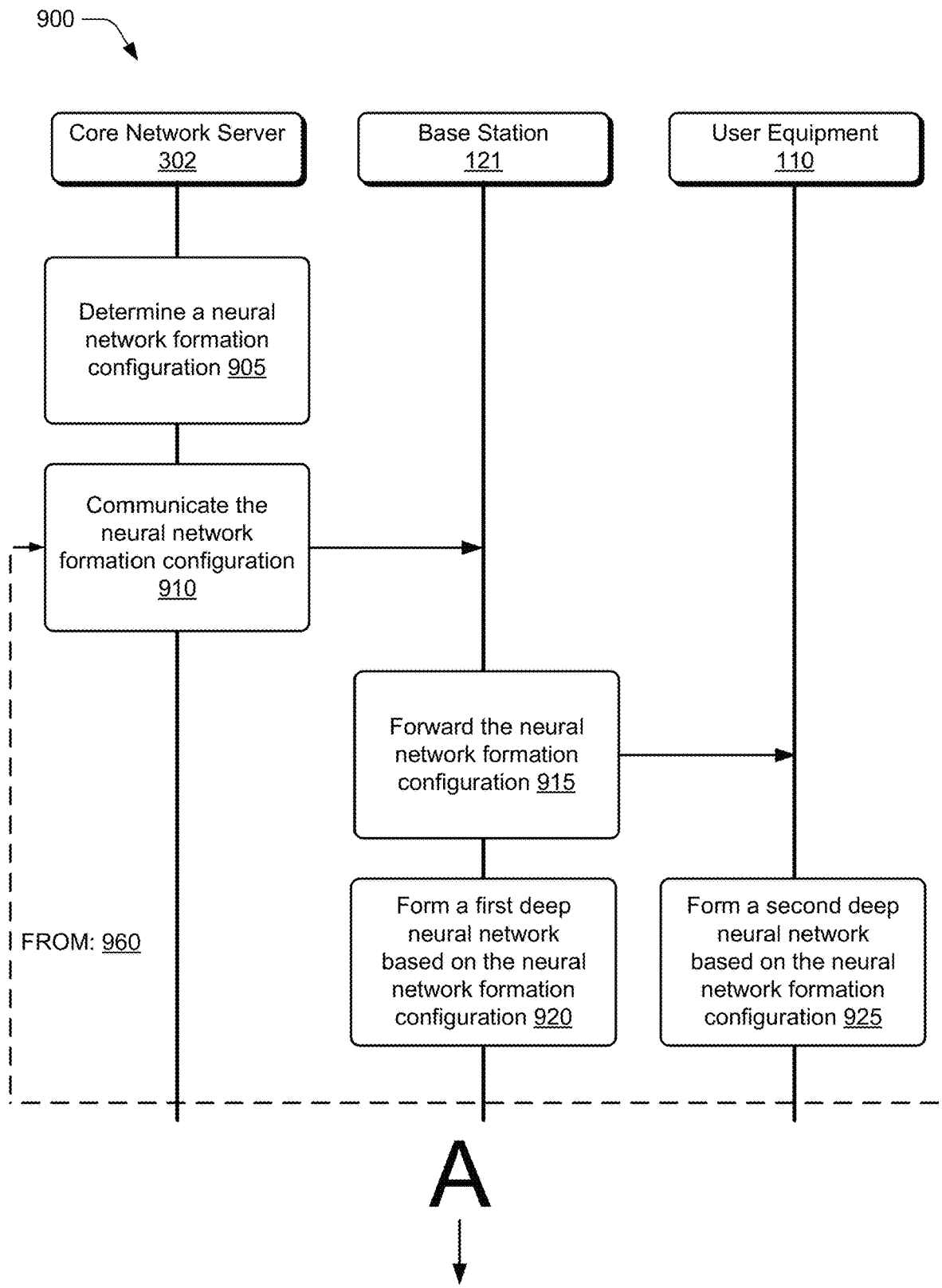
Figures 2, 9:
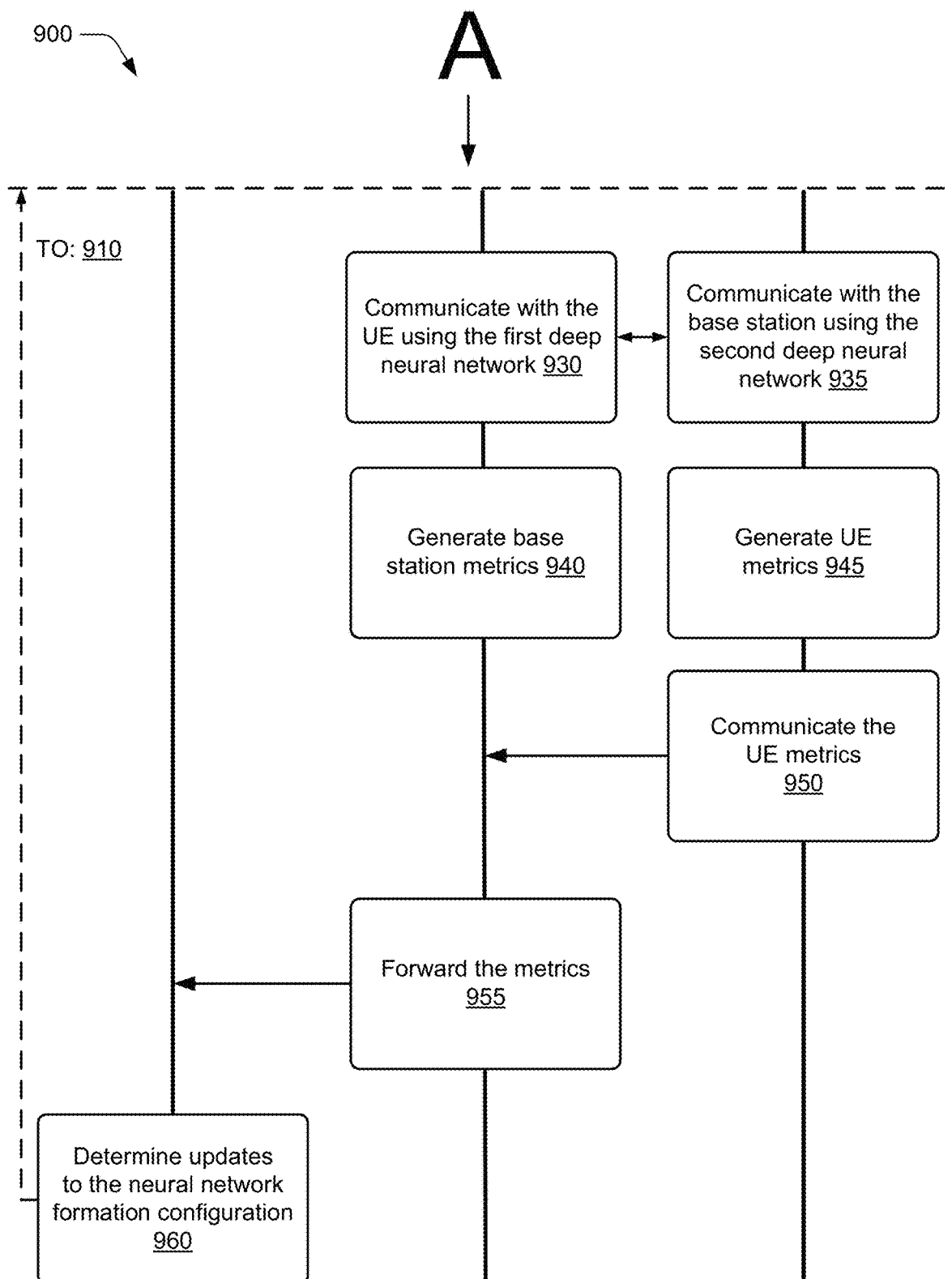

FIGS. 7, 8, and 9 illustrate example signaling and control transaction diagrams between a base station, a user equipment, and/or a core network server in accordance with one or more aspects of base station-user equipment messaging regarding deep neural networks. The signaling and control transactions may be performed by the base station 120 and the UE 110 of FIG. 1, or the core network server 302 of FIG. 3, using elements of FIGS. 1-6. For example, the core network server 302 performs, in some implementations, various signaling and control actions performed by the base station 120 as illustrated by FIGS. 7 and 8.

A first example of signaling and control transactions for base station-user equipment messaging regarding deep neural networks is illustrated by the signaling and control transaction diagram 700 of FIG. 7. As illustrated, at 705 the base station 121 determines a neural network formation configuration. In determining the neural network formation configuration, the base station analyzes any combination of information, such as a channel type being processed by the deep neural network (e.g., downlink, uplink, data, control, etc.), transmission medium properties (e.g., power measurements, signal-to-interference-plus-noise ratio (SINR) measurements, channel quality indicator (CQI) measurements), encoding schemes, UE capabilities, BS capabilities, and so forth.

The base station 121, for instance, receives message(s) from the UE 110 (not shown) that indicates one or more capabilities of the UE, such as, by way of example and not of limitation, connectivity information, dual-connectivity information, carrier aggregation capabilities, downlink physical parameter values, uplink physical parameter values, supported downlink/uplink categories, inter-frequency handover, etc. The base station 121 identifies, from the message(s), the UE capabilities that impact how the UE processes communications, and/or how the base station processes communications from the UE, and selects a neural network formation configuration with improved output accuracy relative to other neural network formation configurations.

In some implementations, the base station 121 selects the neural network formation configuration from multiple neural network formation configurations. Alternately or additionally, the base station 121 selects the neural network formation configuration by selecting a subset of neural network architecture formation elements in a neural network table. At times, the base station 121 analyzes multiple neural network formation configurations and/or multiple neural network formation configuration elements included in a neural network table, and determines the neural network formation configuration by selects and/or creates a neural network formation configuration that aligns with current channel conditions, such as by matching the channel type, transmission medium properties, etc., to input characteristics as further described. Alternately or additionally, the base station 121 selects the neural network formation configuration based on network parameters, such as scheduling parameters (e.g., scheduling Multiple User, Multiple Input, Multiple Output (MU-MIMO) for downlink communications, scheduling MU-MIMO for uplink communications).

At 710, the base station 121 communicates the neural network formation configuration to the UE 110. In some implementations, the base station transmits a message that specifies the neural network formation configuration, such as by transmitting a message that includes an index value that maps to an entry in a neural network table, such as neural network table 216 of FIG. 2. Alternately or additionally, the base station transmits a message that includes neural network parameter configurations (e.g., weight values, coefficient values, number of filters). In some cases, the base station 121 specifies a purpose and/or processing assignment in the message, where the processing assignment indicates what channels, and/or where in a processing chain, the configured neural network applies to, such as a downlink control channel processing, an uplink data channel processing, downlink decoding processing, uplink encoding processing, etc. Accordingly, the base station can communicate a processing assignment with a neural network formation configuration.

In some implementations, the base station 121 communicates multiple neural network formation configurations to the UE 110. For example, the base station transmits a first message that directs the UE to use a first neural network formation configuration for uplink encoding, and a second message that directs the UE to use a second neural network formation configuration for downlink decoding. In some scenarios, the base station 121 communicates multiple neural network formation configurations, and the respective processing assignments, in a single message. As yet another example, the base station communicates the multiple neural network formation configurations using different radio access technologies (RATs). The base station can, for instance, transmit a first neural network formation configuration for downlink communication processing to the UE 110 using a first RAT and/or carrier, and transmit a second neural network formation configuration for uplink communication processing to the UE 110 using a second RAT and/or carrier.

At 715, the UE 110 forms a first neural network based on the neural network formation configuration. For instance, the UE 110 accesses a neural network table using the index value(s) communicated by the base station to obtain the neural network formation configuration and/or the neural network formation configuration elements. Alternately or additionally, the UE 110 extracts neural network architecture and/or parameter configurations from the message. The UE 110 then forms the neural network using the neural network formation configuration, the extracted architecture and/or parameter configurations, etc. In some implementations, the UE processes all communications using the first neural network, while in other implementations, the UE processes select communications using the first neural network based on a processing assignment.

At 720, the base station 121 communicates information based on the neural network formation configuration. For instance, with reference to FIG. 6, the base station 121 processes downlink communications using a second neural network configured with complementary functionality to the first neural network. In other words, the second neural network uses a second neural network formation configuration that is complementary to the neural network formation configuration. In turn, at 725, the UE 110 recovers the information using the first neural network.

A second example of signaling and control transactions for base station-user equipment messaging regarding deep neural networks is illustrated by the signaling and control transaction diagram 800 of FIG. 8. In some implementations, the signaling and control transaction diagram 800 represents a continuation of the signaling and control transaction diagram 700 of FIG. 7.

As illustrated, at 805, the base station 121 communicates with the UE 110 based on a first neural network formation configuration. Similarly, at 810, the UE 110 communicates with the base station 121 based on the first neural network formation configuration. The base station 121, for instance, communicates with the UE 110 by processing one or more downlink communications using the DNNs 604 of FIG. 6, while the UE 110 communicates with the base station 121 by processing downlink communications received from the base station 121 using DNNs 608 of FIG. 6.

In implementations, the DNNs 604 and the DNNs 608 are formed based on the first neural network formation configuration as described. To illustrate, the DNNs 604 and the DNNs 608 perform complementary functionality of one another, where the first neural network formation configuration specifies the complementary functionality for each deep neural network (e.g., the base station forms a first neural network using the first neural network formation configuration, the UE forms a second neural network that is complementary to the first neural network by using a complementary neural network formation configuration to the first neural network formation configuration). The complementary functionality performed by the deep neural networks allows each side exchanging communications to stay synchronized (e.g., accurately recover information). Thus, the first neural network formation configuration specifies any combination of a base station-side neural network formation configuration, a complementary user equipment-side neural network formation configuration, and/or a general neural network formation configuration used by each device participating in the communication exchange.

As another example, the UE 110 processes one or more uplink communications to the base station 121 using the DNNs 612 of FIG. 6, while the base station 121 processes the uplink communications received from the UE 110 using the deep neural network(s) 614 of FIG. 6. Similar to the downlink communications, some implementations form the DNNs 612 and the deep neural network(s) 614 based on the first neural network formation configuration (e.g., the UE forms a first neural network using the first neural network formation configuration, the base station forms a second neural network with a complementary neural network formation configuration to the first neural network formation configuration). Accordingly, the base station 121 and the UE 110 communicate with one another based on the first neural network formation configuration by forming deep neural networks based on the first neural network formation configuration, and processing communications with the deep neural networks.

At 815, the base station generates base station metrics, such as metrics based upon uplink communications received from the UE 110. Similarly, at 820, the UE 110 generates UE metrics, such as metrics based upon downlink communications received from the base station 121. Any type of metric can be generated by the base station 121 and/or UE 110, such as power measurements (e.g., RSS), error metrics, timing metrics, QoS, latency, and so forth.

At 825, the UE 110 communicates the metrics to the base station 121. In implementations, the UE 110 processes the metric communications using a deep neural network based on the first neural network formation configuration. Alternately or additionally, the UE 110 processes the metric communications using a neural network formed using a second neural network formation configuration. Thus, as further described, UE 110 maintains, in some implementations, multiple deep neural networks, where each deep neural network has a designated purpose and/or processing assignment (e.g., a first neural network for downlink control channel processing, a second neural network for downlink data channel processing, a third neural network for uplink control channel processing, a fourth neural network for uplink data channel processing). At times, the base station 121 communicates the multiple neural network formation configurations, used to form the multiple deep neural networks, to the UE 110.

At 830, the base station 121 identifies a second neural network formation configuration based on the metrics at 830. In some implementations, the base station 121 identifies the second neural network formation configuration based on the UE metrics, the base station metrics, or any combination thereof. This includes identifying any combination of architectural changes and/or parameter changes to the neural network formation configuration as further described, such as a small change to the neural network formation configuration that involves updating coefficient parameters to address changes in returned metrics (e.g., SINR changes, Doppler feedback changes, power level changes, BLER changes). Alternately or additionally, identifying the second neural network formation configuration includes a large change, such as reconfiguring node and/or layer connections, based on metrics such as a change in a power state (e.g., a transition from a radio resource connected state to idle state).

In some implementations, the base station 121 identifies a partial and/or delta neural network formation configuration as the second neural network formation configuration, where the partial and/or delta neural network formation configuration indicates changes to a full neural network formation configuration. A full neural network formation configuration, for example, includes an architectural configuration for a neural network and parameter configurations, while a partial and/or delta neural network formation configuration specifies changes and/or updates to the parameter configurations based on using the same architectural configuration indicated in the full neural network formation configuration.

In some implementations, the base station identifies the second neural network formation configuration by identifying a neural network formation configuration in a neural network table that improves the UE's ability, and/or the base station's ability, to recover data from the communications (e.g., improve an accuracy of the recovered information). To illustrate, the base station 121 identifies, by way of the base station neural network manager 268 of FIG. 2, a neural network formation configuration that compensates for problems identified by the UE metrics and/or the base station metrics. As another example, the base station 121 identifies a neural network formation configuration with one or more input characteristics that align with changing operating conditions identified by the UE metrics and/or the base station metrics. Alternately or additionally, the base station 121 identifies a neural network formation configuration that produces similar results but with less processing, such as for a scenario in which a UE moves to a lower power state.

At 840, the base station 121 directs the UE 110 to update the first neural network with the second neural network formation configuration. The base station, for instance, generates an update message that includes an index value to the second neural network formation configuration in the neural network table 216 of FIG. 2. In some implementations, the base station 121 indicates, in the message, a time instance that directs the UE 110 on when to apply the second neural network formation configuration. In other words, the time instance directs the UE 110 to switch from processing communications using the first neural network formation configuration to processing communications using the second neural network formation configuration at the time specified in the time instance. In implementations, the base station transmits updates to downlink neural networks using a first carrier or RAT, and transmits updates to uplink neural networks using a second carrier or RAT.

At 845, the base station 121 updates a base station neural network based on the second neural network formation configuration, such as the deep neural network formed based on the first neural network formation configuration and used to communicate with the UE 110 at 805 (e.g., a deep neural network for processing downlink communications, a deep neural network for processing uplink communications). Similarly, at 850, the UE 110 updates a user equipment neural network based on the second neural network formation configuration, such as a deep neural network that performs complementary functionality to the base station neural network updated at 845. The UE, as one example, extracts the index value and/or time value from the update message transmitted by the base station at 840. The UE 110 obtains the second neural network formation configuration and modifies the user equipment neural network at the time specified in the update message. Thus, the UE 110 uses the first neural network formation configuration for processing communications until the specified time in the update message, at which point the UE 110 switches to processing communications using the second neural network formation configuration.

In implementations, the base station 121 and/or the UE 110 iteratively perform the signaling and control transactions described in the signaling and control transaction diagram 800, signified in FIG. 8 with dashed lines. These iterations allow the base station 121 and/or the UE 110 to dynamically modify communication processing chains based upon changing operating conditions as further described.

A third example of signaling and control transactions for base station-user equipment messaging regarding deep neural networks is illustrated by the signaling and control transaction diagram 900 of FIGS. 9-1 and 9-2. As illustrated in FIG. 9-1, at 905, the core network server 302 determines a neural network formation configuration based on a variety of metrics and/or parameters, such as metrics from the UE 110, metrics from the base station 121, UE capabilities, etc. For example, the core network server receives any combination of metrics and/or parameters from the base station 121 and/or the UE 110, such as power information, SINR information, CQI, CSI, Doppler feedback, QoS, latency, UE capabilities, a base station type (e.g., eNB, gNB or ng-eNB), protocol versions, error metrics, UE capabilities, BS capabilities, power mode, and so forth. The core network server 302 then determines the neural network formation configuration based on the metrics, parameters, etc.

In some implementations, the core network server 302 determines multiple different neural network formation configurations, each of which is specific to a respective base station and/or respective UE. Alternately or additionally, the core network server 302 determines a neural network formation configuration used by multiple base stations and/or UEs. At times, the core network server 302 determines a default neural network formation configuration used by base stations and/or UEs to initially connect with one another. As further described, a default neural network formation configuration corresponds to a general neural network formation configuration that configures the deep neural network to process a variety of input data and/or channel conditions with an accuracy within a threshold range or value. A dedicated neural network formation configuration, however, corresponds to a deep neural network that is tuned to a particular type of input data and/or particular channel conditions. In determining the neural network formation configuration, some implementations of the core network server determine complementary neural network formation configurations (e.g., a base station-side neural network formation configuration that is complementary to a user equipment-side neural network formation configuration).

At 910, the core network server 302 communicates the neural network formation configuration to the base station 121. For instance, the core network server 302 communicates an index value to the base station 121 over the core network interface 318 of FIG. 3, where the index value maps to an entry in the neural network table 272 of FIG. 2. Alternately or additionally, the core network server 302 communicates various parameter configurations, such as coefficients, weights, layer connection values, etc.

At 915, the base station 121 forwards the neural network formation configuration to the UE 110. The base station, for instance, wirelessly transmits the index value to the UE, wirelessly transmits the parameter configurations to the UE, and so forth. In communicating the neural network formation configuration, the core network server 302 and/or the base station 121 sometimes indicates a processing assignment for the neural network formation configuration (e.g., downlink data channel processing, uplink control channel processing, decoding processing, uplink encoding processing, uplink modulating processing, downlink demodulating processing).

In some implementations, the base station 121 adds modifications the neural network formation configuration before forwarding to the UE 110. For example, the base station 121 can have access to more updated information than the core network server, such as by through UE capabilities received from the UE 110. The base station 121, at times, adapts the neural network formation configuration based upon the updated information (e.g., UE capabilities particular to the UE 110), such as by removing layers and/or nodes to reduce a corresponding complexity of the deep neural network at the UE 110 based available processing capabilities, batter power, available radios, etc. at the UE. As another example, the base station 121 adds convolutional layers to the neural network formation configuration based on the updated information. Afterwards, the base station 121 forwards the modified neural network formation configuration to the UE 110, in lieu of the neural network formation configuration received from the core network server 302.

At 920, the base station 121 forms a first deep neural network using the neural network formation configuration, such as by identifying a base station-side neural network formation configuration and forming the first deep neural network with the base station-side neural network formation configuration. To illustrate, the base station 121 obtains the neural network formation configuration by using an index value to access neural network table 272 of FIG. 2. Similarly, at 925, the UE 110 forms a second deep neural network using the neural network formation configuration, such as by identifying a complementary and/or user equipment-side neural network formation configuration and forming the second neural network with the complementary and/or user equipment-side neural network formation configuration. In some implementations, the UE 110 obtains the complementary and/or user equipment-side neural network formation configuration by using an index value to access the neural network table 216 of FIG. 2. Accordingly, the first deep neural network and the second deep neural network are synchronized neural networks based on the neural network formation configuration determined and communicated by the core network server at 905 and at 910.

In FIG. 9-2, at 930, the base station 121 communicates with the UE 110 using the first deep neural network, such as by generating and/or processing downlink communications to the UE 110, by receiving and/or processing uplink communications from the UE 110, etc. Similarly, at 935, the UE 110 communicates with the base station 121 using the second deep neural network at 935. In other words, the UE 110 communicates with the base station 121 using a complementary deep neural network (e.g., the second deep neural network) that is based on the neural network formation configuration as further described.

At 940, the base station generates base station metrics, where the base station 121 generates the metrics based on the communicating at 930 and/or at 935. Thus, the base station metrics can be based on uplink communications received from the UE 110. For example, the base station 121 generates uplink received power, uplink SINR, uplink packet errors, uplink throughput, timing measurements, and so forth. In some implementations, the base station includes base station capabilities (BS capabilities), such as processing power (e.g., macro base station, small-cell base station), power state, etc., in the base station metrics.

Similarly, at 945, the UE 110 generates UE metrics (e.g., power information, SINR information, CQI, CSI, Doppler feedback, QoS, latency) based on downlink communications from the base station 121 and communicates the UE metrics to the base station 121 at 950.

At 955, the base station 121 forwards the metrics to the core network server 302, such as through core network interface 318. This includes any combination of the base station metrics and the UE metrics generated at 940 and/or at 945. Afterwards, the core network server 302 determines updates to the neural network formation configuration at 960. This can include any combination of architectural structure changes (e.g., reconfiguring node connections, reconfiguring active layers/inactive layers), changing applied processing parameters (e.g., coefficients, kernels), and so forth. Thus, the core network server 302, at times, identifies small changes and/or large changes, such as those described with reference to the base station 121 at 830 of FIG. 8. By receiving metrics generated from UE 110, by way of base station 121, the core network server 302 receives feedback about the communication channel between the base station and the UE and/or an indication of how well the neural network processes communications transmitted over the communication channel. The core network server 302 analyzes the feedback to identify adjustments to the neural network formation configuration that, when applied to the neural network, improve the accuracy of how the deep neural network processes communications (e.g., more accurate recovery of data, less erroneous data) and/or how efficiently the neural network processes the communications (e.g. selecting configurations that reduce processing time of the deep neural network).

In implementations, the core network server 302, base station 121 and/or the UE 110 iteratively perform the signaling and control transactions described in the signaling and control transaction diagram 900, signified in FIGS. 9-1 and 9-2 with a dashed line that returns from 960 to 910. These iterations allow the core network server 302, the base station 121 and/or the UE 110 to dynamically modify communication processing chains based upon changing operating conditions as further described.

In some implementations, core network server 302 receives feedback from multiple UEs and/or base stations in the wireless communication system. This provides the core network server with a larger view of how well the wireless communication system performs, what devices communicate over the wireless communication system, how well the devices communicate, and so forth. In various implementations, the core network server 302 determines updates to the neural network formation configuration based on optimizing the communications of the multiple devices and/or an overall system performance, rather than optimizing the communications of a particular device.

Having described signal and control transactions that can be used to configure neural networks for processing communications, consider now some example methods that are in accordance with one or more implementations.

Example Methods

Example methods 1000 and 1100 are described with reference to FIG. 10 and FIG. 11 in accordance with one or more aspects of base station-user equipment messaging regarding deep neural networks. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 10:
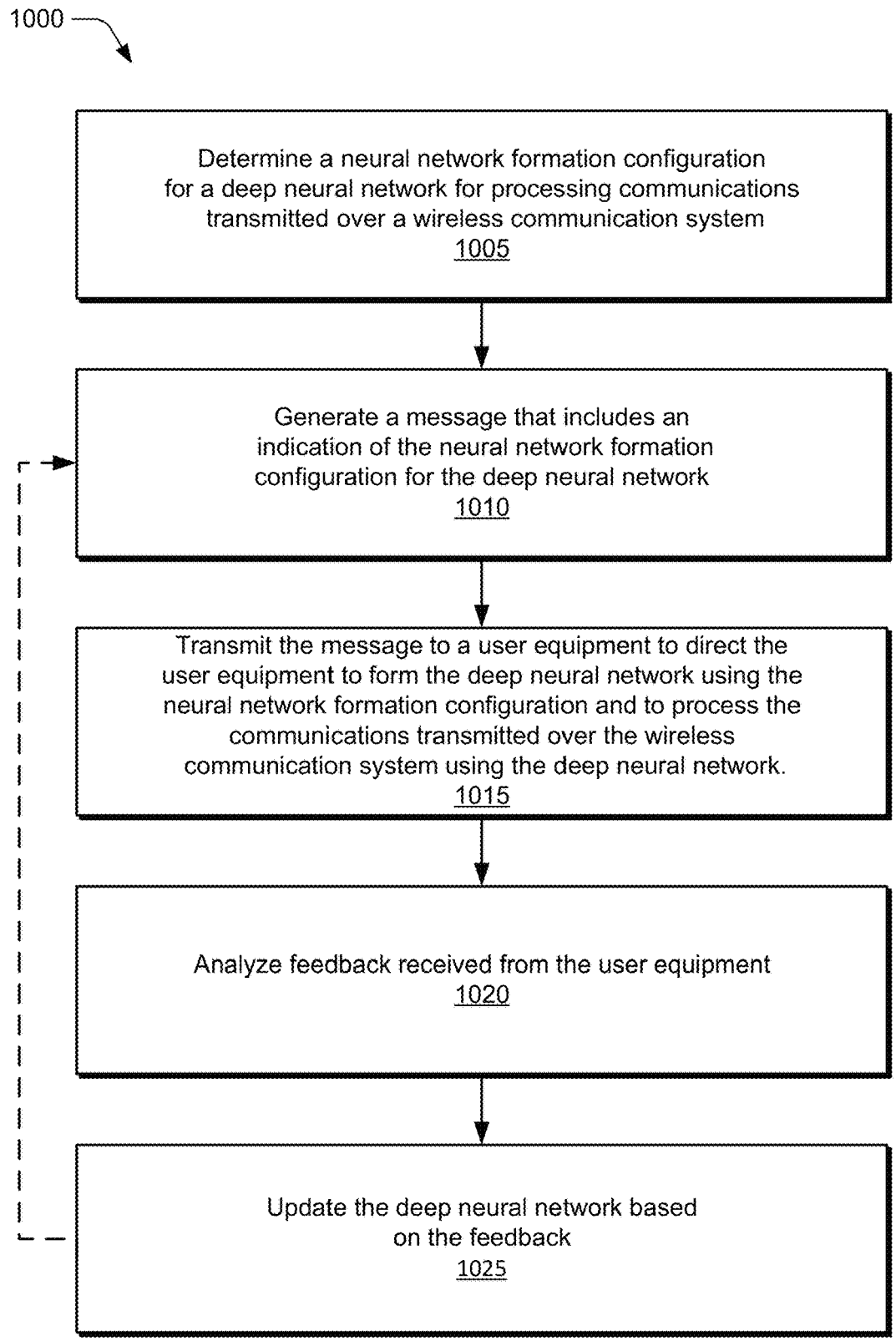
FIG. 10 illustrates an example method for configuring a neural network for processing communications transmitted over a wireless communication system.

FIG. 10 illustrates an example method 1000 for configuring a neural network for processing communications exchanged over a wireless communication system. In some implementations, operations of method 1000 are performed by a network entity, such as the base station 121 or the core network server 302.

At 1005, a network entity determines a neural network formation configuration for a deep neural network for processing communications transmitted over the wireless communication system. The network entity (e.g., base station 121, core network server 302) for example, determines the neural network formation configuration based, at least in part, on metrics, feedback, and/or other types of information from the user equipment (e.g., UE 110). To illustrate, the base station 121 receives a message from the UE 110 that indicates one or more capabilities of the UE 110. The base station 121 then determines the neural network formation configuration based, at least in part, on the capabilities received from the UE 110. Alternately or additionally, base station 121 forwards the UE capabilities to the core network server 302, and the core network server 302 determines the neural network formation configuration based on the capabilities of the UE 110. As another example, the base station 121 determines the neural network formation configuration based on scheduling MU-MIMO downlink and/or uplink transmissions in the wireless communication system. In determining the neural network formation configuration, the network selects any combination of neural network formation configuration elements for user equipment-side deep neural networks, base station-side deep neural networks, and/or a deep neural network that corresponds to both the user equipment-side deep neural networks and the base station-side deep neural networks.

In determining the neural network formation configuration, the network entity (e.g., base station 121, the core network server 302) sometimes selects a default neural network formation configuration. Alternately or additionally, the network entity analyzes multiple neural network formation configurations, and selects a neural network formation configuration, from the multiple, that aligns with current channel conditions, capabilities of a particular UE, etc.

At 1010, the network entity generates a message that includes an indication of the neural network formation configuration for the deep neural network. The network entity (e.g., base station 121, core network server 302), for instance, generates a message that includes index value(s) that map(s) to one or more entries of a neural network table (e.g., neural network table 216, neural network table 272, neural network table 316). In some implementations, the network entity includes an indication of a processing assignment for the deep neural network, where the processing assignment specifies a processing chain function for the deep neural network formed with the neural network formation configuration. Alternately or additionally, the network entity specifies a time instance in the message that indicates a time and/or location to start processing communications with the deep neural network.

At 1015, the network entity transmits the message to a user equipment to direct the user equipment to form the deep neural network using the neural network formation configuration and to process the communications transmitted over the wireless communication system using the deep neural network. The network entity (e.g., core network server 302), for example, transmits the message to the user equipment (e.g., UE 110) by communicating the message to the base station 121, which transmits the message to the user equipment. Alternately or additionally, the network entity (e.g., base station 121) transmits the message to the user equipment (e.g., UE 110). In implementations the deep neural network corresponds to a user equipment-side deep neural network.

In some implementations, the network entity (e.g., base station 121) transmits the message using a particular RAT and/or carrier based upon a processing assignment of the deep neural network. For instance, the base station 121 transmits a first neural network formation configuration with a first processing assignment (e.g., downlink data channel processing) using a first RAT and/or carrier, and a second neural network formation configuration with a second processing assignment (e.g., downlink control channel processing) using a second RAT and/or carrier.

In some implementations, at 1020, the network entity analyzes feedback received from the user equipment. The network entity (e.g., base station 121), as one example, receives metrics from the user equipment (e.g., UE 110), and analyzes the metrics to determine whether to update and/or reconfigure the neural network with a different neural network formation configuration. Alternately or additionally, a base station forwards the feedback to the network entity (e.g., core network server 302), and the network entity analyzes the feedback to determine whether to update and/or reconfigure the neural network with a different neural network formation configuration.

At 1025, the network entity updates the deep neural network based on the feedback. For example, the network entity (e.g., base station 121, core network server 302) analyzes multiple neural network formation configurations included in a neural network table (e.g., neural network table 216, neural network table 272, neural network table 316), and selects a second neural network formation configuration that aligns with new channel conditions indicated by the feedback. The network entity generates a second message that includes an indication of the second neural network formation configuration, and transmits the second message to the user equipment. This includes configuring and transmitting the second message as described at 1010 and/or at 1015. In implementations, the network entity iteratively performs various operations of the method 1000, indicated here with a dashed line that returns from 1025 to 1010.

Figure 11:
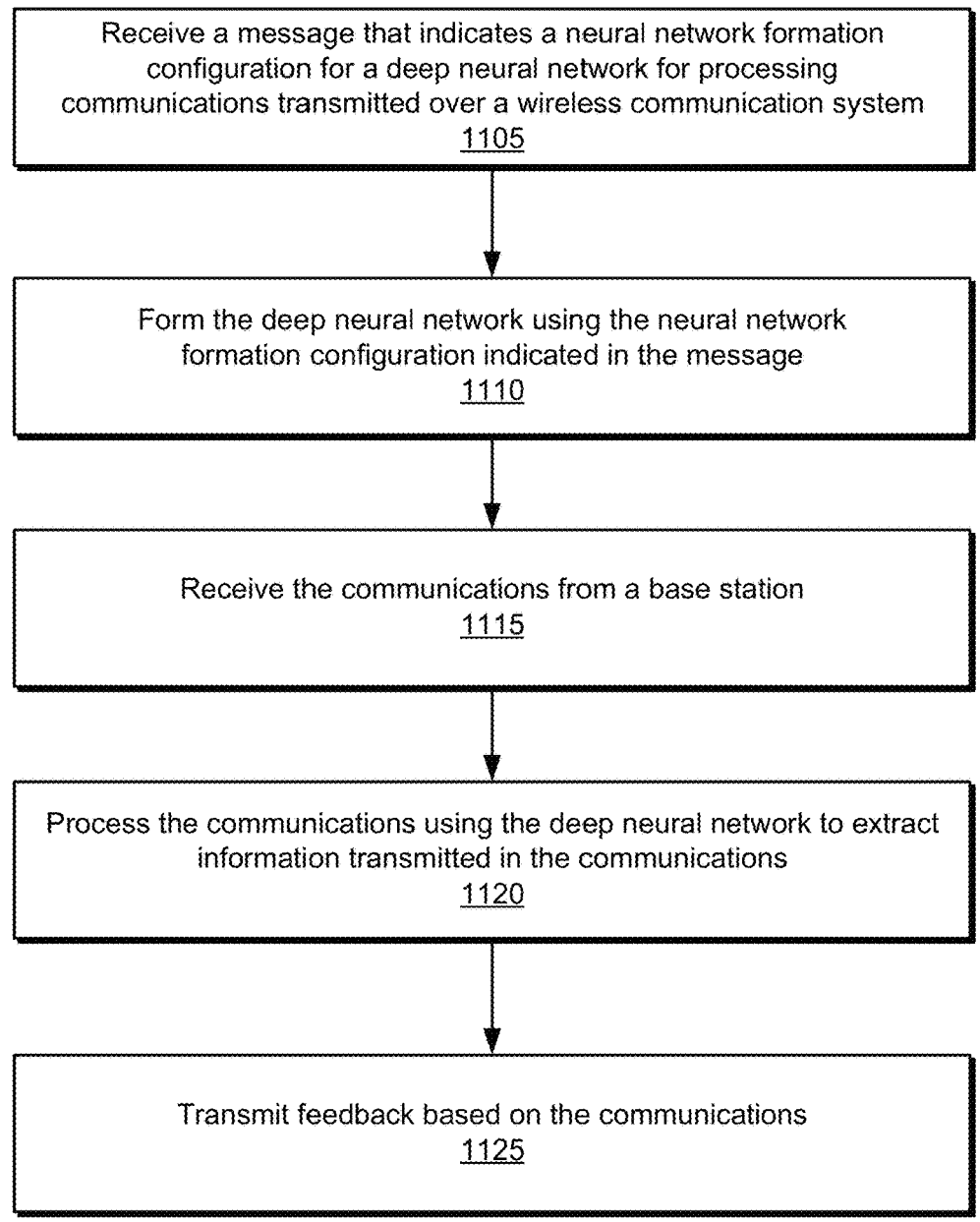
FIG. 11 illustrates an example method for forming a neural network based on a neural network formation configuration.

FIG. 11 illustrates an example method 1100 for forming a neural network based on a neural network formation configuration. In some aspects, operations of method 1100 are implemented by a UE, such as UE 110.

At 1105, a user equipment receives a message that indicates a neural network formation configuration for a deep neural network for processing communications transmitted over a wireless communication system. The user equipment (e.g., UE 110), for instance, receives a message from a base station (e.g., the base station 121) that indicates the neural network formation configuration and/or a processing assignment for the deep neural network formed using the neural network formation configuration. In some implementations, the user equipment receives multiple messages, each of which pertains to a different neural network formation configuration (e.g., a first message that indicates a first neural network formation configuration for a first deep neural network for processing downlink communications, a second message that indicates a second neural network formation configuration for a second deep neural network for processing uplink communications). In implementations, the user equipment receives the message as a broadcast message from the base station, or as a UE-dedicated message.

At 1110, the user equipment forms the deep neural network using the neural network formation configuration indicated in the message. To illustrate, the user equipment (e.g., UE 110) extracts parameter configurations from the message, such as coefficients, weights, layer connections, etc., and forms the deep neural network using the extracted parameter configurations. As another example, the user equipment (e.g., UE 110) extracts index value(s) from the message and obtains the parameter configurations from a neural network table as further described. Alternately or additionally, the user equipment extracts a time instance from the message, where the time instance indicates a time and/or location to start processing communications using the deep neural network formed with the neural network formation configuration.

At 1115, the user equipment receives communications from a base station. For example, the user equipment (e.g., UE 110) receives downlink data channel communications from a base station (e.g., base station 121), downlink control channel communications from the base station, etc. At 1120, the user equipment processes the communications using the deep neural network to extract information transmitted in the communications. The user equipment (e.g., UE 110), as one example, processes the communications using the deep neural network based on a processing assignment included in the message, such as by demodulating and/or decoding downlink communications from the base station (e.g., base station 121) using the deep neural network, encoding and/or modulating uplink communications to the base station, and so forth.

In some implementations, the user equipment optionally transmits feedback based on the communications at 1125. For instance, the user equipment (e.g., UE 110) generates metrics based on the communications (e.g., error metrics, SINR information, CQI, CSI, Doppler feedback) and transmits the metrics as feedback to the base station (e.g., base station 121).

Having described some example methods that can be used to implement aspects of base station-user equipment messaging using a deep neural network, consider now a discussion of generating and communicating neural network formation configurations that is in accordance with one or more implementations.

Generating and Communicating Neural Network Formation Configurations

Figure 12:
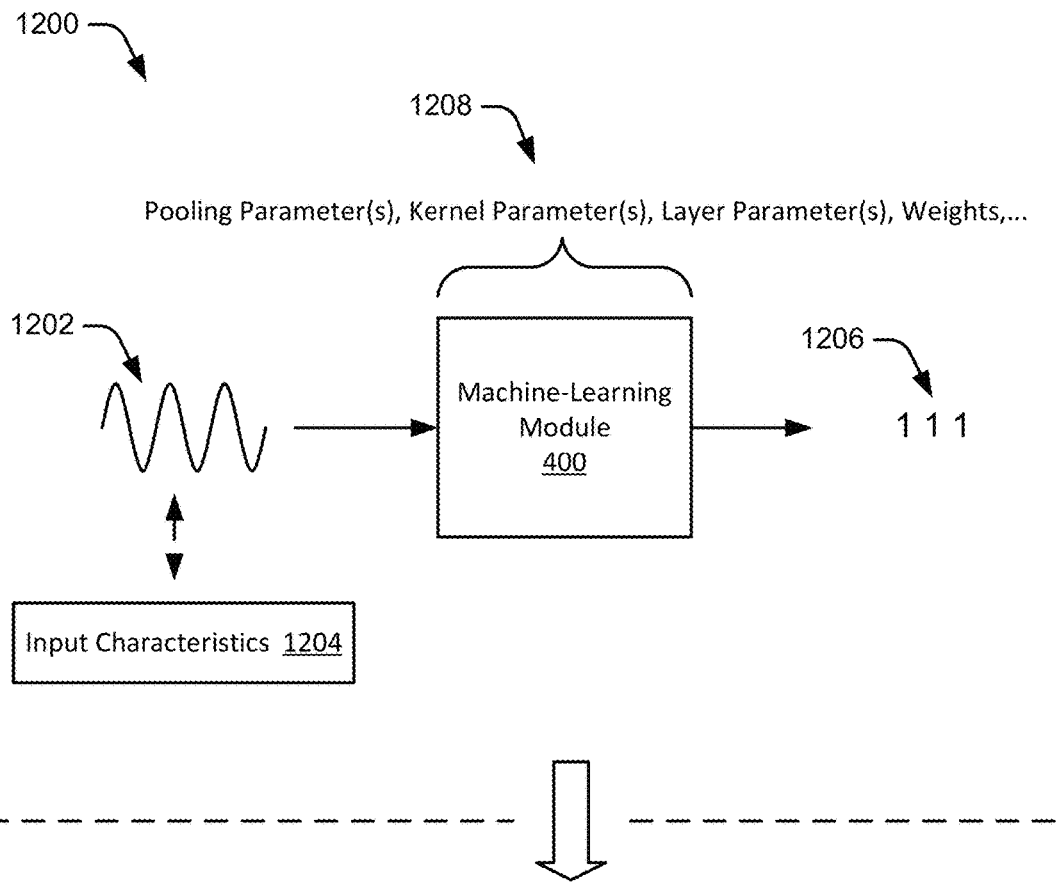
FIG. 12 illustrates an example of generating multiple neural network formation configurations.

In supervised learning, machine-learning modules process labeled training data to generate an output. The machine-learning modules receive feedback on an accuracy of the generated output and modify processing parameters to improve the accuracy of the output. FIG. 12 illustrates an example 1200 that describes aspects of generating multiple NN formation configurations. At times, various aspects of the example 1200 are implemented by any combination of training module 270, base station neural network manager 268, core network neural network manager 312, and/or training module 314 of FIG. 2 and FIG. 3.

The upper portion of FIG. 12 includes machine-learning module 400 of FIG. 4. In implementations, a neural network manager determines to generate different NN formation configurations. To illustrate, consider a scenario in which the base station neural network manager 268 determines to generate a NN formation configuration by selecting a combination of NN formation configuration elements from a neural network table, where the NN formation configuration corresponds to a UE decoding and/or demodulating downlink communications. In other words, the NN formation configuration (by way of the combination of NN formation configuration elements) forms a DNN that processes downlink communications received by a UE. Oftentimes, however, transmission channel conditions vary which, in turn, affects the characteristics of the downlink communications. For instance, a first transmission channel distorts the downlink communications by introducing frequency offsets, a second transmission channel distorts the downlink communications by introducing Doppler effects, a third transmission channel distorts the downlink communications by introducing multipath channel effects, and so forth. To accurately process the downlink communications (e.g., reduce bit errors), various implementations select multiple NN formation configurations, where each NN formation configuration (and associated combination of NN formation configuration elements) corresponds to a respective input condition, such as a first transmission channel, a second transmission channel, etc.

Training data 1202 represents an example input to the machine-learning module 400. In FIG. 12, the training data represents data corresponding to a downlink communication. Training data 1202, for instance, can include digital samples of a downlink communications signal, recovered symbols, recovered frame data, etc. In some implementations, the training module generates the training data mathematically or accesses a file that stores the training data. Other times, the training module obtains real-world communications data. Thus, the training module can train the machine-learning module using mathematically generated data, static data, and/or real-world data. Some implementations generate input characteristics 1204 that describe various qualities of the training data, such as transmission channel metrics, UE capabilities, UE velocity, and so forth.

Machine-learning module 400 analyzes the training data, and generates an output 1206, represented here as binary data. Some implementations iteratively train the machine-learning module 400 using the same set of training data and/or additional training data that has the same input characteristics to improve the accuracy of the machine-learning module. During training, the machine-learning module modifies some or all of the architecture and/or parameter configurations of a neural network included in the machine-learning module, such as node connections, coefficients, kernel sizes, etc. At some point in the training, the training module determines to extract the architecture and/or parameter configurations 1208 of the neural network (e.g., pooling parameter(s), kernel parameter(s), layer parameter(s), weights), such as when the training module determines that the accuracy meets or exceeds a desired threshold, the training process meets or exceeds an iteration number, and so forth. The training module then extracts the architecture and/or parameter configurations from the machine-learning module to use as a NN formation configuration and/or NN formation configuration element(s). The architecture and/or parameter configurations can include any combination of fixed architecture and/or parameter configurations, and/or variable architectures and/or parameter configurations.

The lower portion of FIG. 12 includes neural network table 1212 that represents a collection of NN formation configuration elements, such as neural network table 216, neural network table 272, and/or neural network table 316 of FIG. 2 and FIG. 3. The neural network table 1212 stores various combinations of architecture configurations, parameter configurations, and input characteristics, but alternate implementations exclude the input characteristics from the table. Various implementations update and/or maintain the NN formation configuration elements and/or the input characteristics as the machine-learning module learns additional information. For example, at index 1214, the neural network manager and/or the training module updates neural network table 1212 to include architecture and/or parameter configurations 1208 generated by the machine-learning module 400 while analyzing the training data 1202.

The neural network manager and/or the training module alternately or additionally adds the input characteristics 1204 to the neural network table and links the input characteristics to the architecture and/or parameter configurations 1208. This allows the input characteristics to be obtained at a same time as the architecture and/or parameter configurations, such as through using an index value that references into the neural network table (e.g., references NN formation configurations, references NN formation configuration elements). In some implementations, the neural network manager selects a NN formation configuration by matching the input characteristics to a current operating environment, such as by matching the input characteristics to current channel conditions, UE capabilities, UE characteristics (e.g., velocity, location, etc.) and so forth.

Figure 13:
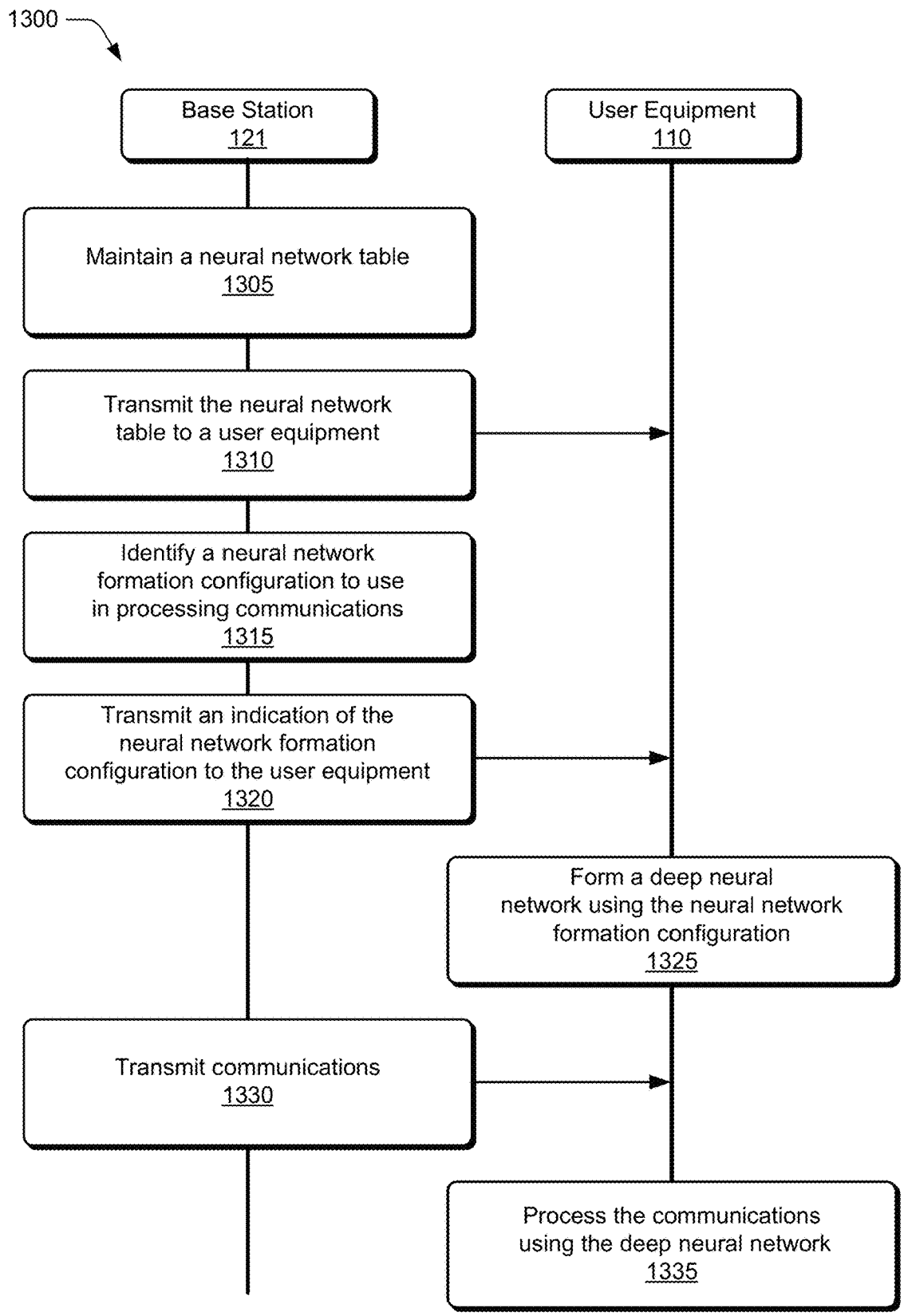
FIG. 13 illustrates an example transaction diagram between various devices for communicating neural network formation configurations.
Figure 14:
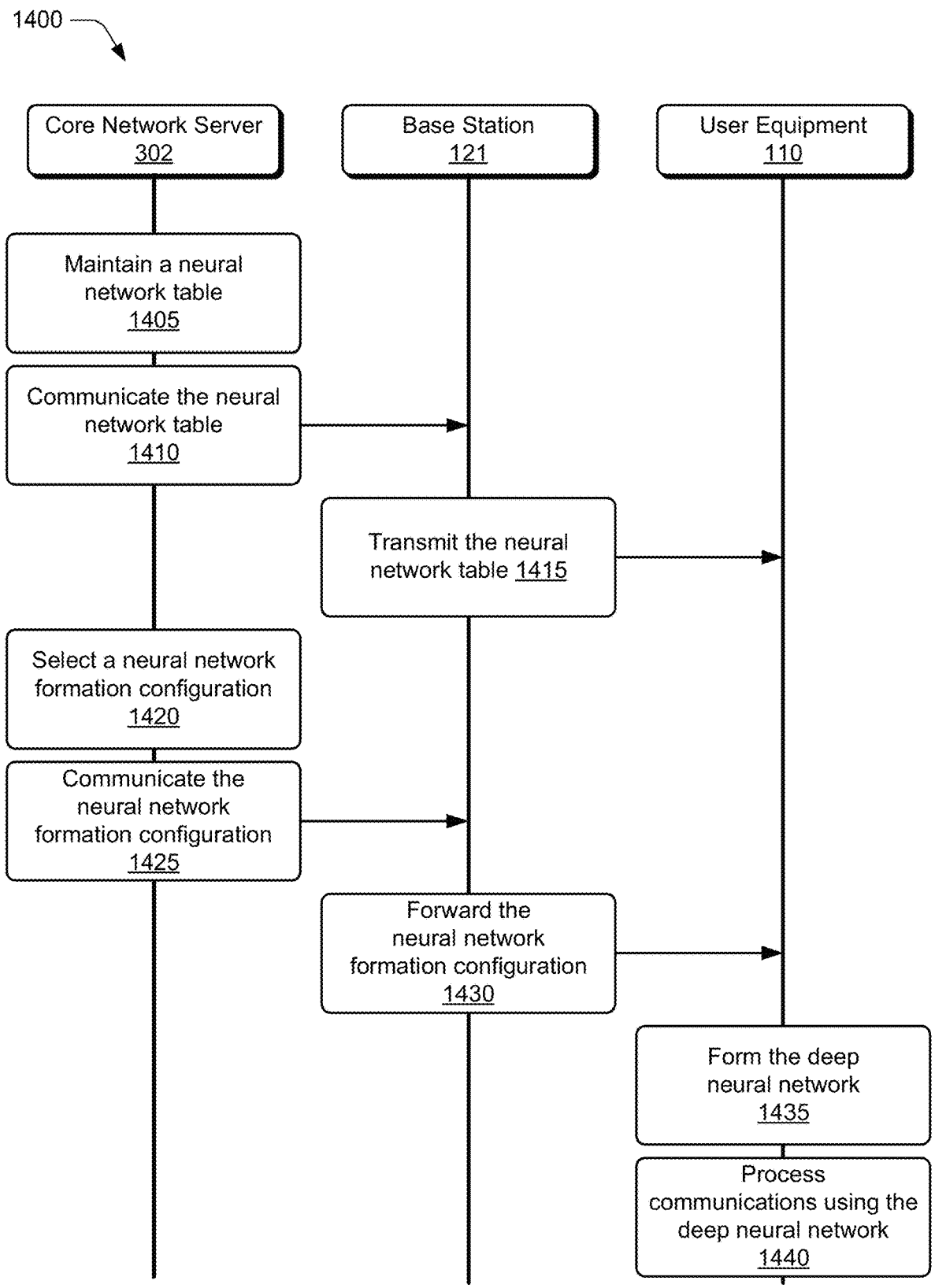
FIG. 14 illustrates an example transaction diagram between various network entities for communicating neural network formation configurations.
Figure 15:
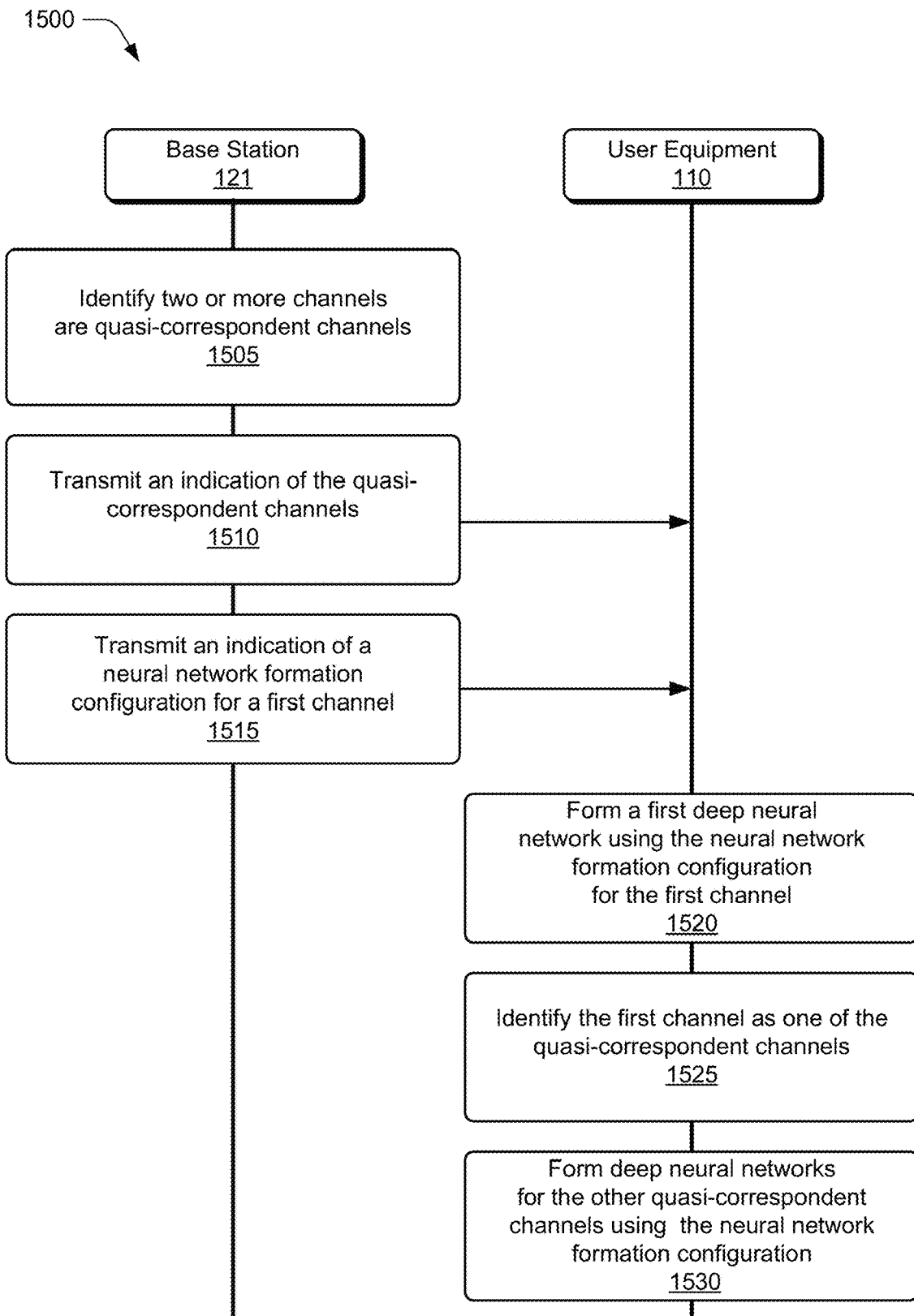
FIG. 15 illustrates an example transaction diagram between various network entities for communicating neural network formation configurations.

Having described generating and communicating neural network formation configurations, consider now a discussion of signal and control transactions over a wireless communication system that can be used to communicate neural network formation configurations that is in accordance with one or more implementations Signaling and Control Transactions to Communicate Neural Network Formation Configurations FIGS. 13-15 illustrate example signaling and control transaction diagrams between a base station, a user equipment, and/or a core network server in accordance with one or more aspects of communicating neural network formation configurations, such as communicating a NN formation configuration. In implementations, the signaling and control transactions may be performed by the base station 121 and the UE 110 of FIG. 1, or the core network server 302 of FIG. 3, using elements of FIGS. 1-12.

A first example of signaling and control transactions for communicating neural network formation configurations is illustrated by the signaling and control transaction control diagram 1300 of FIG. 13. In implementations, portions or all of the signaling and control transactions described with reference to the signaling and control transaction control diagram correspond to signaling and control transactions described with reference to FIG. 7 and/or FIG. 8.

As illustrated, at 1305 the base station 121 maintains a neural network table. For example, a base station neural network manager and/or the training module of the base station 121 (e.g., base station neural network manager 268, training module 270) generate and/or maintain a neural network table (e.g., neural network table 272) using any combination of mathematically generated training data, data extracted from real-world communications, files, etc. In various implementations, the base station 121 maintains multiple neural network tables, where each neural network table includes multiple neural network formation configurations and/or neural network formation configuration elements for a designated purpose, such as a first neural network table designated for data channel communications, a second neural network table designated for control channel communications, and so forth.

At 1310, the base station 121 transmits the neural network table to the UE 110. As one example, the base station transmits the neural network table using layer 3 messaging (e.g., Radio Resource Control (RRC) messages). In transmitting the neural network table, the base station transmits any combination of architecture and/or parameter configurations that can be used to form a deep neural network, examples of which are provided in this disclosure. Alternately or additionally the base station transmits an indication with the neural network table that designates a processing assignment for the neural network table. Accordingly, the base station transmits multiple neural network tables to the UE, with a respective processing assignment designated for each neural network table. In some implementations, the base station 121 broadcasts the neural network table(s) to a group of UEs. Other times, the base station 121 transmits a UE-dedicated neural network table to the UE 110.

At 1315, the base station 121 identifies a neural network formation configuration to use in processing communications. For example, the base station determines a neural network formation configuration to use in processing the communications by selecting a combination of neural network formation architecture elements, such as that described at 705 of FIG. 7, by analyzing any combination of information, such as a channel type being processed by a deep neural network (e.g., downlink, uplink, data, control, etc.), transmission medium properties (e.g., power measurements, signal-to-interference-plus-noise ratio (SINR) measurements, channel quality indicator (CQI) measurements), encoding schemes, UE capabilities, BS capabilities, and so forth. Thus, in some implementations, the base station 121 identifies the neural network formation configuration base on receiving various metrics and/or parameters, such as that described at 815, 820, and 830 of FIG. 8. In some implementations, the base station 121 identifies a default neural network formation configuration to use as the neural network formation configuration. Thus, identifying the neural network formation configuration can include identifying default neural network formation configuration and/or updates to a neural network formation configuration.

In identifying the neural network formation configuration, the base station 121 ascertains a neural network formation configuration in the neural network table that corresponds to the determined neural network formation configuration. In other words, the base station 121 identifies a neural network formation configuration and/or neural network formation configuration elements in neural network table 272 and/or neural network table 216 of FIG. 2 that align with the determined neural network formation configuration, such as by correlating and or matching input characteristics. In identifying the neural network formation configuration and/or neural network formation configuration elements in the neural network table, the base station identifies index value(s) of the neural network formation configuration and/or neural network formation configuration elements.

At 1320, the base station 121 transmits an indication that directs the UE 110 to form a deep neural network using a neural network formation configuration from the neural network table. For example, similar to that described at 710 of FIG. 7 and/or at 840 of FIG. 8, the base station 121 communicates the index value(s) to the UE 110, and directs the UE 110 to form the deep neural network using the neural network formation configuration indicated by the index value(s). The base station can transmit the indication to the UE in any suitable manner. As one example, the base station transmits index value(s) that corresponds to the neural network formation configuration using a layer 2 message (e.g., a Radio Link Control (RLC) message, Medium Access Control (MAC) control element(s)). In some implementations, the base station compares a current operating condition (e.g., channel conditions, UE capabilities, BS capabilities, metrics) to input characteristics stored within the neural network table and identifies stored input characteristics aligned with the current operating condition. In turn, the base station obtains the index value of stored input characteristics which, in turn, provides the index value of the neural network formation configuration and/or neural network formation configuration elements. The base station 121 then transmits the index value(s) as the indication. At times, the base station 121 includes a processing assignment to indicate a position in a processing chain to apply the deep neural network. In some implementations, the base station transmits the index value(s) and/or processing assignment using a downlink control channel.

At times, the base station transmits rule(s) to the UE specifying operating parameters related to applying the neural network formation configuration. In one example, the rules include a time instance that indicates when to process communications with the deep neural network formed using the neural network formation configuration. Alternately or additionally, the rules specify a time threshold value that directs the UE to use a default neural network formation configuration instead of the specified neural network formation configuration when a data channel and control channel are within the time threshold value. Additionally or alternatively, a rule may direct the user equipment to use the same neural network formation configuration for data channel communications and control channel communications when a data channel and control channel are within the time threshold value. To illustrate, consider an example in which the UE processes data channel communications using a first deep neural network (formed using a first neural network formation configuration), and control channel communications using a second deep neural network (formed using a second neural network formation configuration). If the data channel communications and control channel communications fall within the time threshold value specified by the time instance, the UE processes both channels using a default deep neural network (formed with the default neural network formation configuration) and/or the same deep neural network, since there may not be enough time to switch between the first deep neural network and the second deep neural network.

At times, the base station specifies a default neural network formation configuration to UE(s) using a downlink control channel to communicate the default neural network formation configuration, where the default neural network formation configuration forms a deep neural network that processes a variety of input data. In some implementations, the default neural network formation configuration forms a deep neural network that processes the variety of input data with an accuracy within a threshold range. The default neural network formation configuration can include a generic neural network formation configuration.

To illustrate, some implementations generate or select neural network formation configurations for specific operating conditions, such as a first neural network formation configuration specific to UE downlink control channel processing (e.g., demodulating and/or deciding) with a current operating condition "X", a second neural network formation configuration specific to UE downlink control channel processing with a current operating condition "Y", and so forth. For example, a first neural network formation configuration can correlate to a current operating environment in which a detected interference level is high, a second neural network formation configuration can correlate to a current operating environment in which a detected interference level is low, a third neural network formation configuration can correlate to a current operating environment in which a connected UE appears stationary, a fourth neural network formation configuration can correlate to a current operating environment in which the connected UE appears to be moving and with a particular velocity, and so forth.

Forming a deep neural network using a neural network formation configuration for specific operating conditions improves (relative to forming the deep neural network with other neural network formation configurations) an accuracy of the output generated by the deep neural network when processing input data corresponding to the specific operating conditions. However, this introduces a tradeoff insofar as the deep neural network formed with the neural network formation configuration for specific operating conditions generates output with less accuracy when processing input associated with other operating conditions. Conversely, a default neural network formation configuration corresponds to a neural network formation configuration that processes a wider variety of input, such as a variety of input that spans more operating conditions. In other words, a deep neural network configured with a default neural network formation configuration processes a larger variety of communications relative to neural network formation configurations directed to specific operating conditions.

At 1325, the UE 110 forms the deep neural network using the neural network formation configuration. The UE, as one example, extracts the index value(s) transmitted by the base station 121, and obtains the neural network formation configuration and/or neural network formation configuration elements by accessing the neural network table using the index value(s). Alternately or additionally, the UE 110 extracts the processing assignment, and forms the deep neural network in the processing chain as specified by the processing assignment.

At 1330, the base station 121 transmits communications to the UE 110, such as downlink data channel communications. At 1335, the UE 110 processes the communications using the deep neural network. For instance, the UE 110 processes the downlink data channel communications using the deep neural network to recover the data. As another example, processing the communications includes processing a reply to the communications, where the UE 110 processes, using the deep neural network, uplink communications in reply to the downlink communications.

A second example of signaling and control transactions for communicating neural network formation configurations is illustrated by the signaling and control transaction diagram 1400 of FIG. 14. As illustrated, at 1405 the core network server 302 maintains a neural network table. The core network neural network manager 312 and/or the training module 314 of the core network server 302, for instance, generate and/or maintain the neural network table 316 using any combination of mathematically generated training data, data extracted from real-world communications, files, etc. In various implementations, the core neural network server 302 maintains multiple neural network tables, where each neural network table includes multiple neural network formation configuration elements for a designated processing assignment (e.g., a first neural network table designated for data channel communications, a second neural network table designated for control channel communications).

At 1410, the core network server 302 communicates the neural network table to the base station 121, such as by using the core network interface 318 of FIG. 3. In some implementations, the core network server communicates multiple neural network tables to the base station. At 1415, the base station 121 transmits the neural network table to the UE 110, such as by transmitting the neural network table using layer 3 messaging, by transmitting the neural network table using a downlink control channel, by broadcasting the neural network table, by transmitting the neural network table using a UE-dedicated message, and so forth.

At 1420, the core network server 302 selects a neural network formation configuration. As one example, the core network server 302 compares a current operating condition to input characteristics stored within the neural network table and identifies stored input characteristics aligned with the current operating condition (e.g., channel conditions, UE capabilities, BS capabilities, metrics). The core network server then obtains the index value(s) of the aligned input characteristics which, in turn, provides the index value(s) of the neural network formation configuration and/or neural network formation configuration elements. The core network server 302 then communicates the selected neural network formation configuration to the base station at 1425, such as by communicating the index value(s) using core network interface 318. In some implementations, the core network server communicates a processing assignment with the neural network formation configuration.

At 1430, the base station 121 forwards the neural network formation configuration to the UE 110. As an example, the base station 121 transmits the index value(s) to the UE 110, such as through layer 2 messaging (e.g., an RLC message, MAC control element(s)), to direct the UE to form the deep neural network using the neural network formation configuration, such as that described at 1320 of FIG. 13. In implementations, the base station 121 additionally forms a complementary deep neural network based on the neural network formation configuration (not shown here), such as that described in FIG. 6, at 720 of FIG. 7, at 845 of FIG. 8, and/or at 920 of FIG. 9-1. At times, the base station communicates the processing assignment received from the core network server with the index value. In response to receiving the neural network formation configuration, the UE 110 forms the deep neural network at 1435, and processes communications received from the base station 121 using the deep neural network at 1440, such as that described at 725 of FIG. 7, at 810 of FIG. 8, at 935 of FIG. 9, and/or 1335 of FIG. 13.

In some implementations, a UE derives a first neural network formation configuration from a second neural network formation configuration when similarities are present in a wireless communication system. To illustrate, consider an example of quasi-correspondent channels. Quasi-correspondent channels are channels within a wireless communication system that have shared or the same properties, such as a same delay spread, a same Doppler spread, a same spatial signature, a same spatial beam, a same spatial direction, same data rate, and so forth. Alternately or additionally, quasi-correspondent channels have correlated physical properties within a threshold range or value. In various implementations, a UE derives a first neural network formation configuration from a second neural network formation configuration in response to identifying these similarities.

To illustrate, consider now a third example of signaling and control transactions for communicating neural network formation configurations, illustrated in FIG. 15 by the signaling and control transaction diagram 1500. In the third example, a UE derives a neural network formation configuration based on identified similarities. While the signaling and control transaction diagram 1500 illustrates the base station 121 and the UE 110 of FIG. 1, alternate implementations include a core network server, such as core network server 302 of FIG. 3 performing some or all of the functionality performed by the base station 121.

At 1505, the base station 121 identifies two or more channels that are quasi-correspondent channels. The base station 121 or core network server 302 (using base station neural network manager 268 of FIG. 2 or core network neural network manager 312 of FIG. 3), for example, compares various beam properties of two or more channels, such as direction, intensity, divergence, profile, quality, etc. The base station 121 determines that the two or more channels are quasi-correspondent when an arbitrary number of properties match and/or correlate to one another within a predefined threshold.

At 1510, the base station 121 transmits an indication of the quasi-correspondent channels to the UE 110, such as by transmitting the indication of quasi-correspondent channels using layer 2 messaging, layer 3 messaging, and/or layer 1 signaling. The indication denotes any arbitrary number of channels as being quasi-correspondent with one another, where the channels can be physical channels and/or logical channels. As one example, the indication denotes that a downlink control channel is quasi-correspondent with a downlink data channel when the channels have similar data rates. As another example, the indication denotes that two physical channels at different carrier frequencies are quasi-correspondent based on the physical channels having a similar spatial beam.

At 1515, the base station 121 transmits an indication of a neural network formation configuration for one of the quasi-correspondent channels. For example, the base station transmits index value(s) and processing assignment that designates the formed deep neural network for processing a first channel, such as a downlink control channel.

At 1520, the UE 110 forms a first deep neural network using the neural network formation configuration for the first channel (e.g., the downlink control channel). At 1525, the UE 110 identifies the first channel as one of the quasi-correspondent channels. The UE, for instance, compares the first channel to the quasi-correspondent channels identified by, and received from, the base station 121. In response to identifying the first channel as being one of the quasi-correspondent channels, the UE determines to apply the neural network formation configuration to the other channels that are quasi-correspondent to the first channel. Accordingly, at 1530, the UE 110 forms deep neural networks for the other quasi-correspondent channels using the neural network formation configuration. By identifying channels as quasi-correspondent channels, the neural network formation configuration need only be changed for one of the quasi-correspondent channels and this will result in the neural network formation configuration being changed for all the quasi-correspondent channels without the need to change individually the neural network formation configuration for each of the other quasi-correspondent channels.

Having described signal and control transactions that can be used to communicate neural network formation configurations, consider now an example environment that can be used to communicate neural network formation configurations by using a set of candidate neural network formation configurations that is in accordance with one or more implementations.

Communicating a Set of Candidate Neural Network Formation Configurations

Figures 1, 16:
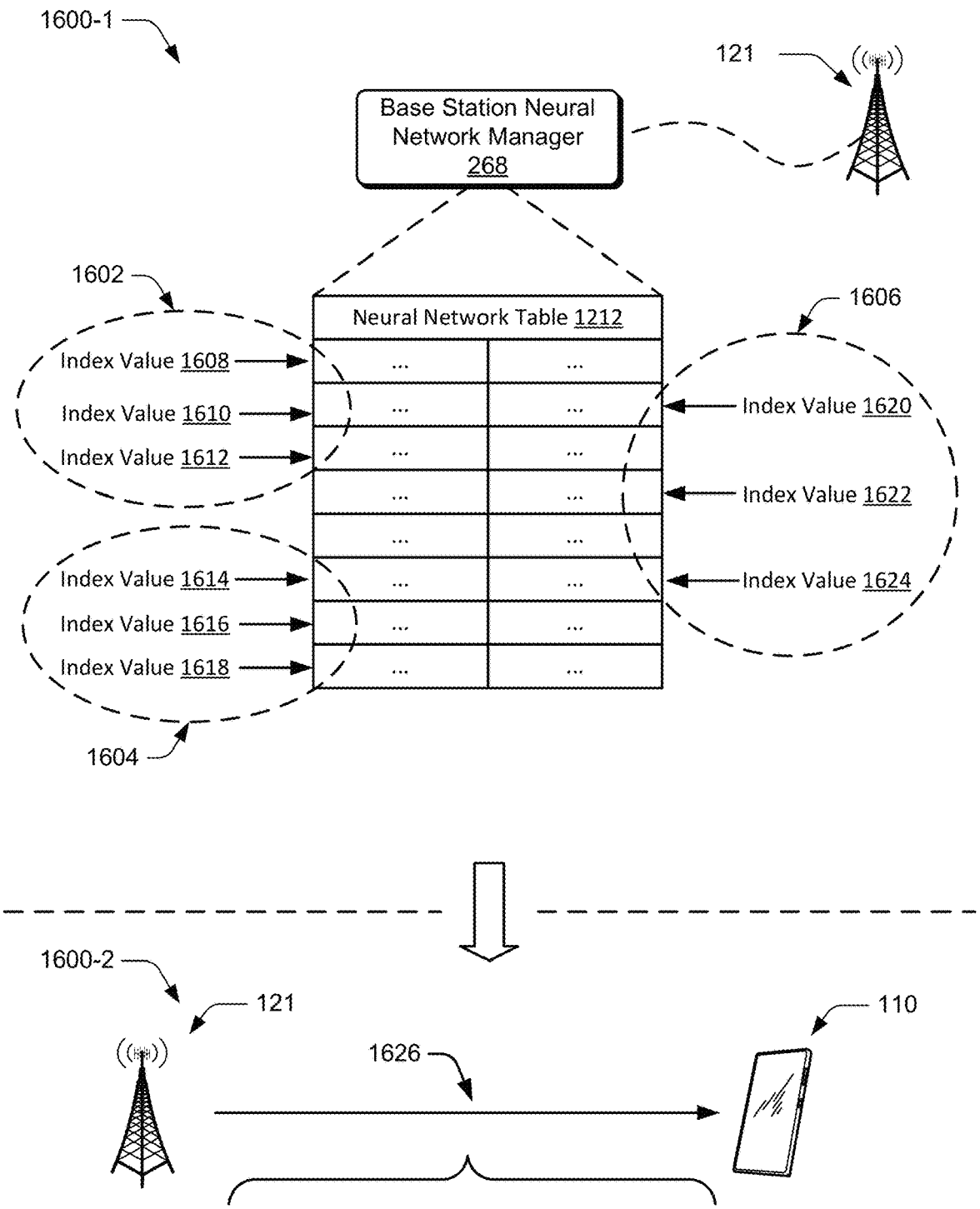
Figures 2, 16:
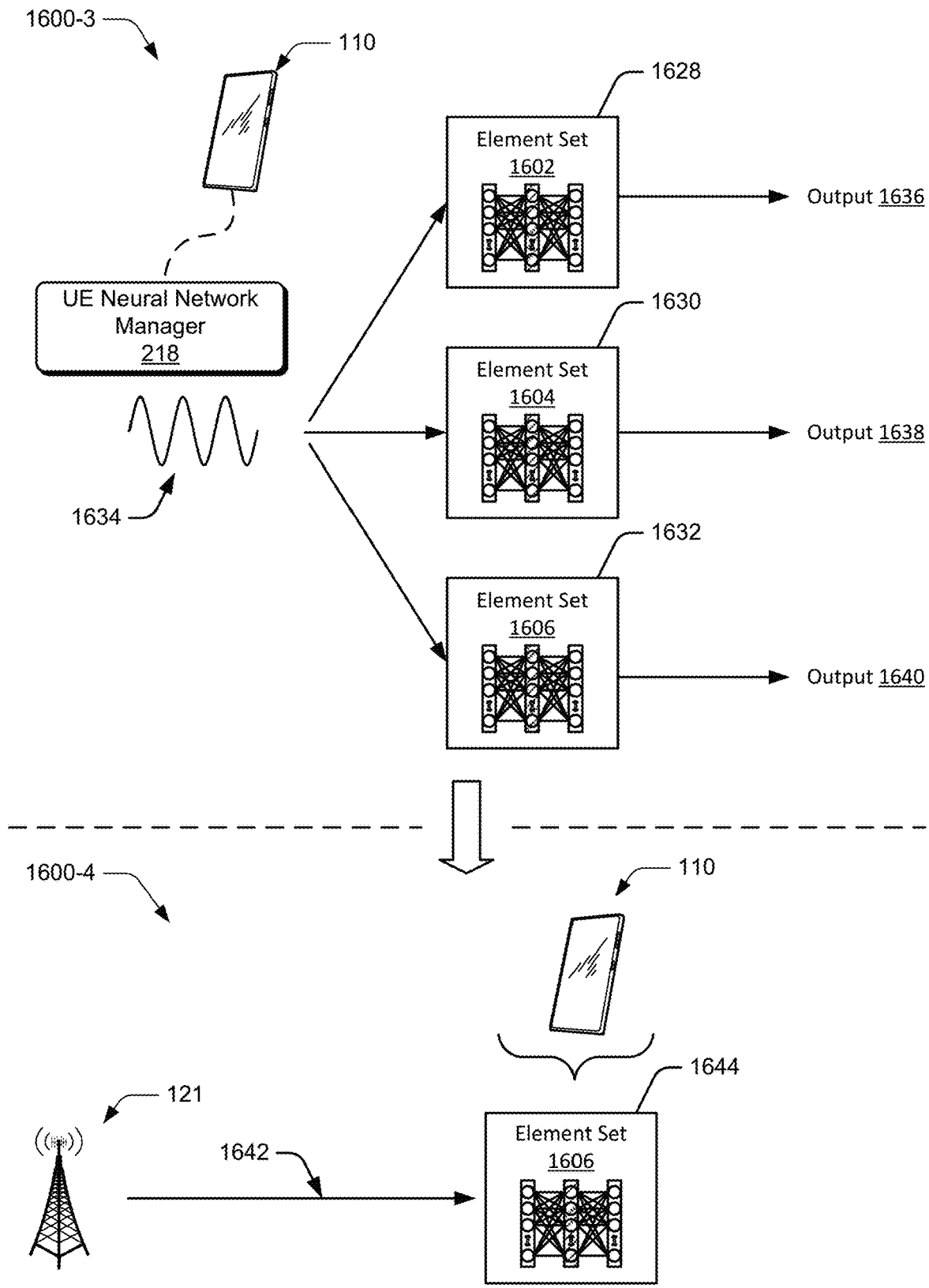

In some implementations, a network entity communicates a set of candidate NN formation configuration elements to a UE, and the UE selects one NN formation configuration from the set of candidate NN formation configuration elements. To illustrate, consider FIGS. 16-1 and 16-2 that illustrate an example environment 1600 for communicating neural network formation configurations using a set of candidate neural network formation configuration elements. FIGS. 16-1 and 16-2 illustrate the example environment 1600 at different points in time, labeled as environment 1600-1, environment 1600-2, environment 1600-3, and environment 1600-4, respectively. Thus, the environment 1600-1, the environment 1600-2, the environment 1600-3, and the environment 1600-4 collectively represent the environment 1600 over a progression of events.

In the environment 1600-1, the base station neural network manager 268 of the base station 121 selects at least one set of candidate NN formation configuration elements from the neural network table 1212 of FIG. 12. For example, the base station neural network manager 268 receives various metrics, parameters, and/or other types of feedback, such as that described at 815 and at 825 of FIG. 8. The base station neural network manager 268 then analyzes the neural network table 1212 to identify NN formation configuration elements that align with the feedback, correct for problems identified by the feedback, and so forth.

In implementations, the base station neural network manager identifies multiple sets of NN formation configuration elements, such as by identifying NN formation configurations with input characteristics that fall within a threshold range. In the environment 1600-1, the base station neural network manager 268 identifies and selects three sets of NN formation configuration elements: NN formation configuration element set 1602, NN formation configuration element set 1604, and NN formation configuration element set 1606. In some implementations, each NN formation configuration element set corresponds to a respective NN formation configuration.

In environment 1600-1, the NN formation configuration element set 1602 includes index values 1608, 1610, and 1612, the NN formation configuration element set 1604 includes index values 1614, 1616, and 1618, and the NN formation configuration element set 1606 includes index values 1620, 1622, and 1624. While environment 1600-1 illustrates the base station neural network manager 268 of the base station 121 selecting the sets of candidate NN formation configuration elements, alternate implementations select the set of candidate NN formation configuration elements using the core network neural network manager 312 of the core network server 302 or both. Alternately or additionally, the base station neural network manager and/or the core network neural network manager select a single index value which maps to a grouping of NN formation configuration elements.

In the environment 1600-2, the base station 121 transmits, to the UE 110, an indication 1608 that references each set of candidate NN formation configuration elements (e.g., NN formation configuration element set 1602, NN formation configuration element set 1604, NN formation configuration element set 1606). For example, the indication includes the index values 1602, 1604, 1606, 1608, 1610, 1612, 1614, 1616, and 1618 to communicate the three sets of candidate NN formation configuration elements to the UE 110. Alternately or additionally, the indication includes directions to select a NN formation configuration from a set of candidate NN formation configurations. While the environment 1600-1 and the environment 1600-2 illustrate sets of NN formation configuration elements corresponding to a candidate NN formation configuration, alternate implementations select a single index for each candidate NN formation configuration that maps to a grouping of elements as further described.

In the environment 1600-3 of FIG. 16-2, the UE neural network manager 218 of the UE 110 analyzes the sets of candidate NN formation configuration elements to determine which of the sets to use for processing particular communications (e.g., for processing transmission communications, for processing received communications). In one example, the UE neural network manager forms a first candidate deep neural network 1628 (candidate DNN 1628) based on the first NN formation configuration element set 1602 (e.g., index values 1608, 1610, 1612), a second candidate deep neural network 1630 (candidate DNN 1630) based on the second NN formation configuration element set 1604 (e.g., index values 1608, 1610, 1612), a third candidate deep neural network 1632 (candidate DNN 1632) based on the third NN formation configuration element set 1606 (e.g., index values 1614, 1616, 1618), and so forth. In other words, the UE neural network manager 218 obtains each NN formation configuration from a neural network table (e.g., neural network table 216) using the index values, and forms at least one candidate deep neural network using a set of candidate NN formation configuration elements.

The UE neural network manager 218 then obtains one or more metrics associated with a set of candidate deep neural networks and selects the neural network formation configuration based on the one or more metrics. Some implementations obtain a respective error metric for each candidate neural network formation configuration of the set of candidate neural network formation configurations to generate a set of error metrics. The UE neural network manager then compares each error metric of the set of the error metrics to a threshold value, and selects the neural network formation configuration based on the set of error metric. To illustrate, the UE neural network manager, in some examples, identifies a particular error metric (e.g., CRC passes) in the set of error metrics that indicates less error relative to other error metrics in the set of error metrics, and selects, as the neural network formation configuration, a particular candidate neural network formation configuration, from the set of candidate neural network formation configurations, that corresponds to the particular error metric. In an example implementation, the UE neural network manager 218 analyzes each candidate DNN, such as by providing a known input 1634 to each candidate DNN and comparing the respective outputs from each candidate deep neural network (e.g., output 1636, output 1638, output 1640). Alternately or additionally, the UE neural network manager provides other types of input, examples of which are provided herein.

To illustrate, consider an example in which each candidate DNN corresponds to generating transmitter communications. The UE neural network manager can compare various transmission metrics of output 1636, output 1638, output

1640, such as output power level, modulation quality metrics, intermodulation product metrics, etc. As another example, consider a scenario in which each candidate DNN corresponds to processing receiver communications. The UE neural network manager can then compare various receiver metrics of output 1636, output 1638, output 1640, such as CRC, Signal-to-Noise (SNR), adjacent/alternate channel metrics, BER, Inter-symbol Interference (ISI) metrics, etc. The UE neural network manager 218 then selects one of the candidate neural network formation configurations based on the analysis.

In the environment 1600-4, the UE 110 processes the communications 1642 using a deep neural network 1644 (DNN 1644) formed with the selected candidate neural network formation configuration. In the environment 1600-4, the DNN (which corresponds to the candidate DNN 1632) processes downlink communications received from the base station 121, but in alternate implementations, the DNN 1644 processes uplink communications, such as by generating transmission communications that the UE 110 transmits to the base station 121.

Figure 17:
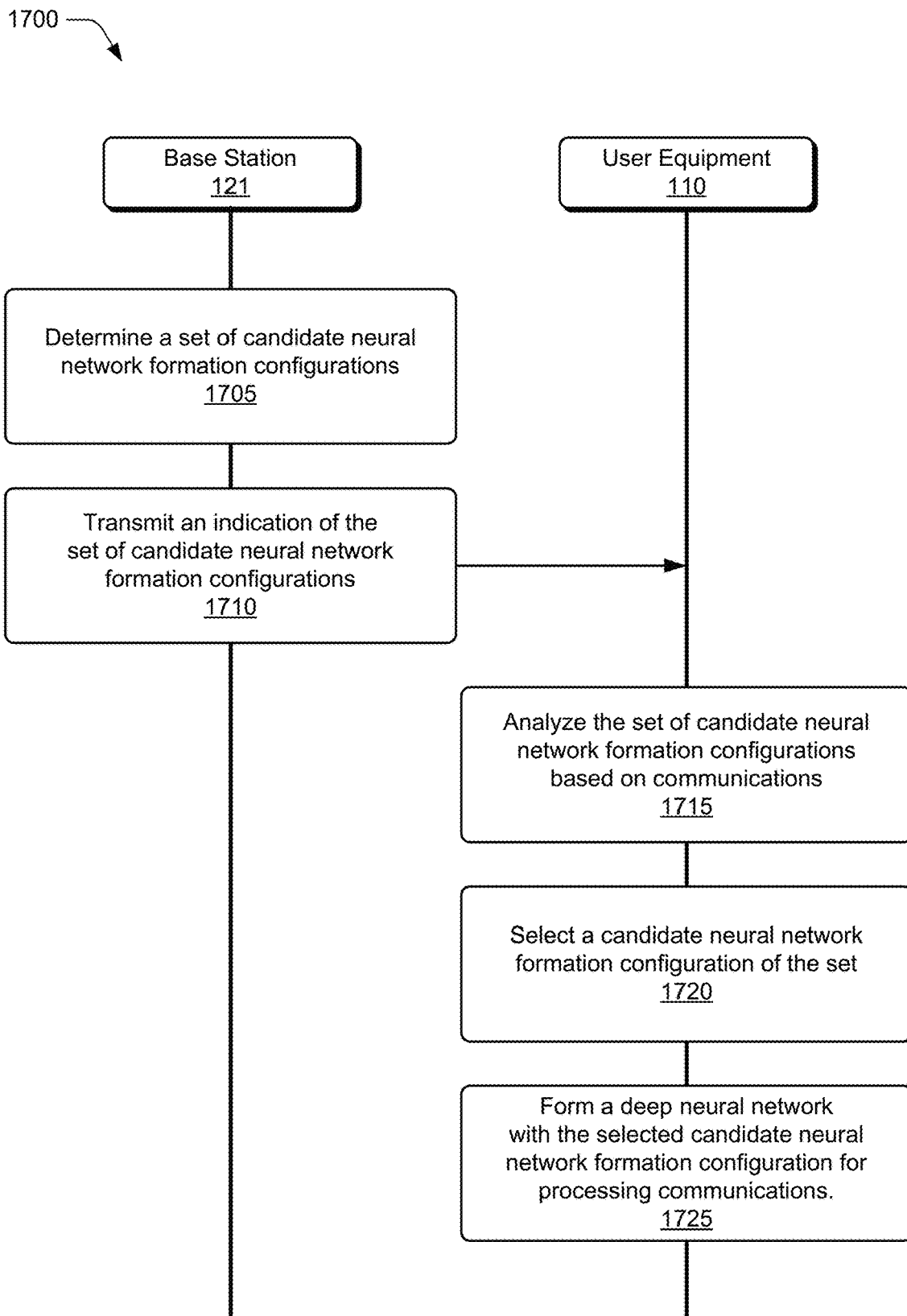
FIG. 17 illustrates an example transaction diagram between various network entities for communicating neural network formation configurations.

Consider now FIG. 17 that illustrates a fourth example of signaling and control transactions for communicating neural network formation configurations, denoted in FIG. 17 by the signaling and control transaction diagram 1700. In the fourth example, a base station provides the UE with multiple candidate neural network formation configurations, and the UE selects one of the candidate neural network formation configurations to form a deep neural network that processes communications. While the signaling and control transaction diagram 1700 illustrates the base station 121 and the UE 110 of FIG. 1, alternate implementations include a core network server, such as core network server 302 of FIG. 3 performing some or all of the functionality performed by the base station 121.

At 1705, the base station 121 determines a set of candidate neural network formation configurations. For example, the base station 121 or the core network server 302 (using base station neural network manager 268 of FIG. 2 or core network neural network manager 312 of FIG. 3) analyzes a neural network table to identify candidate neural network formation configurations (e.g., sets of neural network formation configuration elements) linked to input characteristics within a specified range and/or threshold. To illustrate, the base station analyzes the input characteristics to identify candidate neural network formation configurations with operating conditions that fall within "X"+/−a threshold value. In identifying the candidate neural network formation configurations, the base station alternately or additionally identifies the index value of each candidate neural network formation configuration element selected for the respective candidate neural network formation configuration, such as that described with reference to the environment 1600-1 of FIG. 16-1 (e.g., NN formation configuration element set 1602, NN formation configuration element set 1604, NN formation configuration element set 1606).

At 1710, the base station 121 transmits an indication of the set of candidate neural network formation configurations to the UE 110. For example, with reference to the environment 1600-2 of FIG. 16-1, the base station transmits each index value associated with the set of candidate neural network formation configurations to the UE (e.g. a set of index values corresponding to a set of neural network formation configurations and/or configuration elements). In some cases, the base station transmits the index values in a single message, while in other cases, the base station transmits each index value in a respective message.

At 1715, the UE 110 analyzes the set of candidate neural network formation configurations based on communications transmitted over the wireless communication system, such as communications transmitted by the base station 121. In some implementations, the UE 110 processes the communications by forming a respective deep neural network with each candidate neural network formation configuration and processing the communications with each respective deep neural network, such as by extracting the respective NN formation configuration elements from a neural network table. As one example, the UE performs blind identification of the neural network formation configuration by processing the communications using each of the respective deep neural networks to attempt to decode expected data patterns within the communications, such as that described with reference to the environment 1600-3 of FIG. 16-2. The UE then analyzes each respective deep neural network, such as by analyzing the outputs of each respective deep neural network and generating respective metric(s) (e.g., accuracy, bit errors, etc.).

At 1720, the UE 110 selects a candidate neural network formation configuration of the set of candidate neural network formation configurations. For instance, the UE selects the candidate neural network formation configuration that forms the respective deep neural network that decodes the expected data pattern with the least bit errors relative to other candidate neural network formation configurations. At 1725, the UE 110 forms a deep neural network using the selected candidate neural network formation configuration, and processes communications with the deep neural network, such as that described with reference to the environment 1600-4 of FIG. 16-2.

Having described an example environment, and signal and control transactions, that can be used to communicate neural network formation configurations by using a set of candidate neural network formation configurations, consider now some example methods that are in accordance with one or more implementations.

Example Methods

Example methods 1800 and 1900 are described with reference to FIG. 18 and FIG. 19 in accordance with one or more aspects of communicating neural network formation configurations. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

FIG. 18 illustrates an example method 1800 for communicating a neural network formation configuration for processing communications transmitted over a wireless communication system. In some implementations, operations of the method 1800 are performed by a network entity, such as one of the base stations 120 and/or the core network server 302.

At 1805, the network entity transmits a neural network table that includes a plurality of neural network formation configuration elements, where each neural network formation configuration element of the plurality of neural network formation configuration elements configures at least a portion of a deep neural network for processing communications transmitted over a wireless communication system. For example, the network entity (e.g., base station 121) transmits the neural network table (e.g., neural network table 272, neural network table 316) to the UE (e.g., UE 110) using a broadcast or multicast message to a group of UEs. As another example, the network entity (e.g., base station 121) transmits the neural network table to the UE (e.g., UE 110) using a UE-dedicated message. In some implementations, the network entity (e.g., core network server 302) communicates the neural network table to a base station (e.g., base station 121), and directs the base station to transmit the neural network table to the UE (e.g., UE 110). At times, the network entity transmits the neural network table using layer 3 messaging. Alternately or additionally, the network entity transmits multiple neural network tables, where each neural network table has a designated processing assignment as further described.

At 1810, the network entity selects one or more neural network formation configuration elements from the plurality of neural network formation configuration elements to create a neural network formation configuration. For instance, the network entity (e.g., base station 121, core network server 302) selects the neural network formation configuration elements by comparing current operating condition(s) with input characteristics stored in the neural network table, and selecting the neural network formation configuration elements by correlating or matching the input characteristics to the current operating conditions. In some implementations, the network entity selects a set of candidate neural network formation configurations.

At 1815, the network entity transmits an indication to a user equipment to direct the user equipment to form a deep neural network using the neural network formation configuration and to process communications using the deep neural network. As one example, the network entity (e.g., base station 121) determines index value(s) of the neural network table that corresponds to the neural network formation configuration and/or a set of neural network formation configuration elements, and transmits the index value(s) to UE 110, such as by transmitting the index value(s) using a downlink control channel, by transmitting the index value(s) in layer 2 message(s), etc. As another example, the network entity (e.g., core network server 302) communicates an indication to a base station (e.g., base station 121), and directs the base station to transmit the indication to the user equipment (e.g., UE 110). The network entity alternately or additionally indicates a processing assignment for the deep neural network formed with the neural network formation configuration, such as by indicating a processing assignment that directs the user equipment to process downlink control channel communications with the deep neural network. In some implementations, the network entity indicates a set of candidate neural network formation configurations, such as that described with reference to FIGS. 16-1 and 16-2.

In transmitting the index value(s), the network entity sometimes specifies rule(s) on when to process communications with the corresponding deep neural network. As one example, the network entity (e.g., base station 121, core network server 302) determines a time threshold value between data channel communications and control channel communications. When transmitting the index value to direct the user equipment (e.g., UE 110) to form a deep neural network, the network entity transmits the time value threshold and a rule that directs the user equipment to form the deep neural network using a default formation configuration when a timing between the data channel communications and the control channel communications is below the time threshold value. Additionally or alternatively, a rule may direct the user equipment to use the same neural network formation configuration for data channel communications and control channel communications when a data channel and control channel are within a time threshold value and so there is not enough time to switch between different DNNs.

Figure 19:
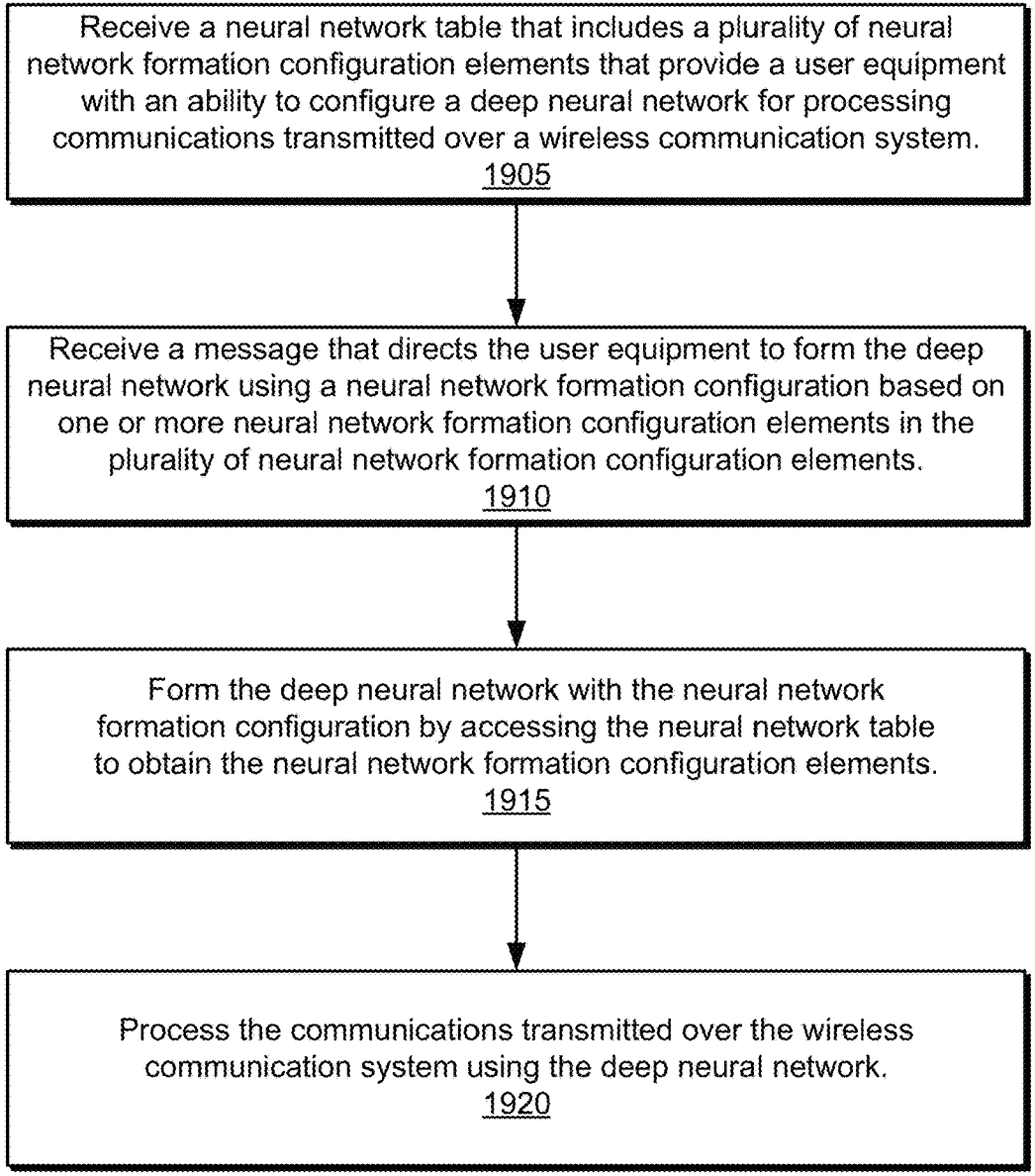
FIG. 19 illustrates an example method for communicating neural network formation configurations over a wireless communication system.

FIG. 19 illustrates an example method 1900 for communicating a neural network formation configuration for processing communications transmitted over a wireless communication system, such as by processing a set of candidate neural network formation configurations and selecting a particular candidate neural network formation configuration as described with reference to FIG. 17. In some implementations, operations of the method 1900 are performed by a user equipment, such as UE 110.

At 1905, a user equipment receives a neural network table that includes a plurality of neural network formation configuration elements that provide a user equipment with an ability to configure a deep neural network for processing communications transmitted over a wireless communication system. The user equipment (e.g., UE 110), for example, receives the neural network table (e.g., neural network table 272) from a base station (e.g., base station 121) in layer 3 messaging. As another example, the user equipment receives the neural network table in a multicast or broadcast message. Alternately or additionally, the user equipment receives the neural network table in a UE-dedicated message. In some cases, the user equipment receives multiple neural network tables, where each neural network table has a designated processing assignment.

At 1910, the user equipment receives a message that directs the user equipment to form the deep neural network using a neural network formation configuration based on one or more neural network formation configuration elements in the plurality of neural network formation configuration elements. For example, the user equipment (e.g., UE 110) receives, in the message, a set of index values to the neural network table, where the set of index values corresponds to a set of candidate neural network formation configurations and/or configuration elements, such as the communication 1626 in the environment 1600-2 of FIG. 16-1, the indication transmitted by base station 121 at 1710 of FIG. 17, etc. In implementations, the user equipment (e.g., UE 110) receives a downlink control channel message that includes index value(s) corresponding to an entry (or entries) in the neural network table. In some implementations, the message includes an indication of a processing assignment for a deep neural network formed with the neural network formation configuration, such as a communication channel processing assignment, a processing chain processing assignment, etc.

At 1915, the user equipment forms the deep neural network with the neural network formation configuration by accessing the neural network table to obtain the neural network formation configuration elements. In one example, the user equipment (e.g., UE 110) accesses the neural network table using the index value(s). Alternately or additionally, the user equipment obtains the set of candidate neural network formation configurations by accessing the neural network table using a sets of index value(s), and forms candidate deep neural networks using each candidate neural network formation configuration, such as that described with reference to the environment 1600-2 of FIG. 16-1 and the environment 1600-3 of FIG. 16-2. The UE 110, for instance, forms a respective candidate deep neural network using each candidate neural network formation configuration and/or configuration elements, and processes the communications with each candidate respective deep neural network to obtain respective metrics about each candidate deep neural network as described at 1715 of FIG. 17, and selects the neural network formation configuration based on the one or more metrics, such as that described at 1720 of FIG. 17.

As one example, the user equipment (e.g., UE 110) obtains an error metric for each candidate neural network formation configuration of the set of candidate neural network formation configurations to generate a set of error metrics, such as CRC metrics. The user equipment compares each CRC metric of the set of the CRC metrics to a threshold value. In turn, the user equipment identifies a particular CRC metric in the set of CRC metrics that exceeds the threshold value, and selects, as the neural network formation configuration, a particular candidate neural network formation configuration, from the set of candidate neural network formation configurations, that corresponds to the particular CRC metric. While described in the context of a CRC metric, other error metrics can be utilized as well, such as BER, ARQ, HARQ, Frame Error Rate (FER), etc.

In some implementations, when forming the deep neural network, the user equipment (e.g., UE 110) determines to process a first communication channel using a first deep neural network formed with the neural network formation configuration, and identifies a second communication channel that is quasi-correspondent to the first communication channel. In response to identifying the second communication channel is quasi-correspondent, the user equipment (e.g., UE 110) determines to process the second communication channel using a second deep neural network formed with the neural network formation configuration.

In response to forming the deep neural network, the user equipment processes the communications transmitted over the wireless communication system using the deep neural network at 1920. For example, the user equipment (e.g., UE 110), processes a downlink communication channel using the deep neural network.

Although aspects of base station-user equipment messaging regarding neural networks, and communicating neural network formation configurations, have been described in language specific to features and/or methods, the subject of the appended claims is not necessarily limited to the specific features or methods described. Rather, the specific features and methods are disclosed as example implementations of base station-user equipment messaging regarding neural networks, and communicating neural network formation configurations, and other equivalent features and methods are intended to be within the scope of the appended claims. Further, various different aspects are described, and it is to be appreciated that each described aspect can be implemented independently or in connection with one or more other described aspects.

In the following, several examples are described.

Example 1: A method performed by a network entity associated with a wireless communication system, the method comprising: determining a neural network formation configuration for a deep neural network for processing communications transmitted over the wireless communication system; generating a message that includes an indication of the neural network formation configuration for the deep neural network; and transmitting the message to a user equipment to direct the user equipment to form the deep neural network using the neural network formation configuration and to process the communications transmitted over the wireless communication system using the deep neural network.

Example 2: The method as recited in example 1, wherein the generating the message further comprises including a processing assignment for the deep neural network in the message.

Example 3: The method as recited in either example 1 or example 2, wherein the generating the message further comprises specifying, in the message, a time instance that indicates a time to start using the deep neural network with the neural network formation configuration for processing the communications.

Example 4: The method as recited in any one of the preceding examples, wherein the neural network formation configuration comprises a first neural network formation configuration, the indication comprises a first indication, the message comprises a first message, and the method further comprises: receiving feedback from the user equipment that provides one or more metrics associated with the communications; determining a second neural network formation configuration for the deep neural network based, at least in part, on the feedback; generating a second message that includes a second indication of the second neural network formation configuration for the deep neural network; and transmitting the second message to the user equipment to direct the user equipment to update the deep neural network with the second neural network formation configuration.

Example 5: The method as recited in example 4, wherein the second neural network formation configuration comprises a delta neural network formation configuration.

Example 6: The method as recited any one of the preceding examples, wherein the determining the neural network formation configuration comprises determining the neural network formation configuration based, at least in part, on scheduling Multiple User, Multiple-Input, Multiple Output downlink transmissions in the wireless communication system.

Example 7: The method as recited in any one of examples 1 to 6, wherein the neural network formation configuration comprises a first neural network formation configuration, the deep neural network comprises a first deep neural network, the communications comprise downlink communications, and the method further comprises: determining a second neural network formation configuration for a second deep neural network for processing uplink communications from the user equipment; and transmitting the second neural network formation configuration to the user equipment and directing the user equipment to form the second deep neural network using the second neural network formation configuration, and to process the uplink communications using the second deep neural network.

Example 8: The method as recited in example 7, wherein the transmitting the message to direct the user equipment to form the deep neural network using the first neural network formation configuration comprises transmitting the message using a first radio access technology, and wherein the transmitting the second neural network formation configuration comprises transmitting the second neural network formation configuration using a second radio access technology that is different from the first radio access technology.

Example 9: The method as recited in any one of examples 1 to 6, wherein the neural network formation configuration comprises a first neural network formation configuration, the deep neural network comprises a first deep neural network, the communications comprise downlink communications, and the method further comprises: forming a second deep neural network; and processing the uplink communications using the second deep neural network to decode the uplink communications.

Example 10: The method as recited in any one of examples 1 to 6, wherein the neural network formation configuration comprises a first neural network formation configuration, the deep neural network comprises a first deep neural network, the communications comprise downlink communications, and the method further comprises: forming a second deep neural network; and processing the downlink communications using the second deep neural network to encode the downlink communications.

Example 11: The method as recited in any one of the preceding examples, wherein the message comprises a first message, and wherein the determining the neural network formation configuration for processing the communications comprises: receiving, from the user equipment, a second message that indicates one or more capabilities of the user equipment; and determining the neural network formation configuration based, at least in part, on the one or more capabilities of the user equipment.

Example 12: A method performed by a user equipment associated with a wireless communication system, the method comprising: receiving, by the user equipment, a message that indicates a neural network formation configuration for a deep neural network for processing communications associated with the wireless communication system; forming the deep neural network using the neural network formation configuration indicated in the message; receiving the communications from a base station; and processing the communications using the deep neural network to extract information in the communications.

Example 13: The method as recited in example 12, wherein the receiving the message that indicates the neural network formation configuration comprises: receiving a broadcast message from the base station; and extracting the neural network formation configuration from the broadcast message.

Example 14: The method as recited in either example 12 or example 13, wherein the forming the deep neural network using the neural network formation configuration comprises extracting, from the message, a time instance that indicates a time to start using the neural network formation configuration to process the communications, and wherein the processing the communications using the deep neural network comprises processing the communications using the deep neural network based on the time indicated by the time instance.

Example 15: The method as recited in any one of examples 12 to 14, wherein the message comprises a first message, the deep neural network comprises a first deep neural network, the communications comprise downlink communications, the processing the communications comprises using the first deep neural network to decode information from the downlink communications, and the method further comprises: receiving, by the user equipment, a second message that indicates a second neural network formation configuration for a second deep neural network for processing uplink communications transmitted over the wireless communication system; forming the second deep neural network using the second neural network formation configuration; and processing the uplink communications using the second deep neural network to encode information on the uplink communications.

Example 16: The method as recited in any one of the preceding examples, wherein the neural network formation configuration comprises a first neural network formation configuration, the message comprises a first message, the indication comprises a first indication, and the method further comprises: receiving a second message that includes a second indication of a second neural network formation configuration for the deep neural network; and forming the deep neural network using the second neural network formation configuration.

Example 17: The method as recited in example 16, wherein the second neural network formation configuration comprises a delta neural network formation configuration.

Example 18: The method as recited in any one of examples 11 to 17, wherein the receiving the message that indicates the neural network formation configuration comprises receiving, in the message, an indication of a processing assignment of the deep neural network, wherein the forming the deep neural network comprises forming the deep neural network in a communications processing chain as specified in the processing assignment.

Example 19: A network entity comprising: a wireless transceiver; a processor; and computer-readable storage media comprising instructions to implement a deep neural network manager module that, responsive to execution by the processor, directs the network entity to perform any one of the methods of examples 1 to 11.

Example 20: A user equipment comprising: a wireless transceiver; a processor; and computer-readable storage media comprising instructions to implement a deep neural network manager module that, responsive to execution by the processor, directs the user equipment to perform any one of the methods of examples 12 to 18.

Example 21: A method performed by a network entity associated with a wireless communication system, the method comprising: transmitting, by the network entity and to a user equipment, a neural network table that includes a plurality of neural network formation configuration elements, each neural network formation configuration element of the plurality of neural network formation configuration elements configuring at least a portion of a deep neural network for processing communications transmitted over the wireless communication system; selecting one or more neural network formation configuration elements from the plurality of neural network formation configuration elements to create a neural network formation configuration; and transmitting an indication to the user equipment to direct the user equipment to form a deep neural network using the neural network formation configuration and to process the communications using the deep neural network.

Example 22: The method as recited in example 21, wherein the transmitting the indication comprises transmitting at least one index value that maps to the one or more neural network formation configuration elements in the neural network table.

Example 23: The method as recited in example 1, wherein the selecting the neural network formation configuration comprises selecting a set of candidate neural network formation configuration elements, and wherein transmitting the indication comprises transmitting an indication of the set of candidate neural network formation configuration elements.

Example 24: The method as recited in example 3, wherein the transmitting the indication of the set of candidate neural network formation configuration elements comprises transmitting a set of index values that map to entries in the neural network table.

Example 25: The method as recited in any one of the preceding examples, wherein the indication comprises a first indication, the deep neural network comprises a first deep neural network, the neural network formation configuration comprises a first neural network formation configuration, and the method further comprises: directing the user equipment to process control channel communications transmitted over the wireless communication system using the first deep neural network; determining a second neural network formation configuration; and transmitting a second indication to the user equipment to direct the user equipment to form a second deep neural network using the second neural network formation configuration and to process data channel communications transmitted over the wireless communication system using the second deep neural network.

Example 26: The method as recited in example 25, further comprising: determining a time threshold value between the data channel communications and the control channel communications; and directing the user equipment to form the second deep neural network using a default formation configuration when a timing between the data channel communications and the control channel communications is below the time threshold value.

Example 27: The method as recited in any one of the preceding examples, wherein the transmitting the neural network table comprises transmitting the neural network table in a multicast message.

Example 28: The method as recited in any one of the preceding examples, wherein the neural network formation configuration comprises a first neural network formation configuration, the indication comprises a first indication, and the method further comprises: receiving feedback from the user equipment that provides one or more metrics associated with the communications; determining a second neural network formation configuration for the deep neural network based, at least in part, on the feedback; and transmitting a second indication to the user equipment to direct the user equipment to update the deep neural network with the second neural network formation configuration.

Example 29: The method as recited in example 28, wherein the second neural network formation configuration comprises a delta neural network formation configuration.

Example 30: A method performed by a user equipment associated with a wireless communication system, the method comprising: receiving, by the user equipment, a neural network table that includes a plurality of neural network formation configuration elements that provide the user equipment with an ability to configure a deep neural network for processing communications transmitted over the wireless communication system; receiving, by the user equipment, a message that directs the user equipment to form the deep neural network using a neural network formation configuration based on one or more neural network formation configuration elements in the plurality of neural network formation configuration elements; forming the deep neural network with the neural network formation configuration by accessing the neural network table to obtain the one or more neural network formation configuration elements; and processing the communications transmitted over the wireless communication system using the deep neural network.

Example 31: The method as recited in example 30, wherein the receiving the message that directs the user equipment to form the deep neural network using the neural network formation configuration further comprises: extracting a processing assignment from the message; and wherein the forming the deep neural network with the neural network formation configuration comprises forming the deep neural network in a communications processing chain as specified in the processing assignment.

Example 32: The method as recited in example 30 or example 31, wherein the receiving the message that directs the user equipment to form the deep neural network using the neural network formation configuration further comprises receiving at least one index value that maps to an entry in the neural network table, and wherein the forming the deep neural network with the neural network formation configuration comprises accessing the neural network table using the index value.

Example 33: The method as recited in any one of the preceding examples, wherein the deep neural network comprises a first deep neural network, and wherein the forming the deep neural network with the neural network formation configuration further comprises: determining to process a first communication channel by using the first deep neural network formed with the neural network formation configuration; identifying a second communication channel is quasi-correspondent to the first communication channel; and determining, based on the identifying, to process the second communication channel using a second deep neural network formed with the neural network formation configuration.

Example 34: The method as recited in example 33, wherein the identifying the second communication channel is quasi-correspondent to the first communication channel comprises receiving an indication that the second communication channel and the first communication channel are quasi-correspondent.

Example 35: The method as recited in example 30, wherein the receiving the message that directs the user equipment to form the deep neural network using the neural network formation configuration further comprises receiving, by the user equipment, a set of index values that correspond to candidate neural network formation configuration elements to use as the neural network formation configuration, and wherein the forming the deep neural network with the neural network formation configuration by accessing the neural network table to obtain the neural network formation configuration comprises: accessing the neural network table using the set of index values to obtain the candidate neural network formation configuration elements; forming a set of candidate deep neural networks, using the candidate neural network formation configuration elements, to process the communications; obtaining one or more metrics associated with the set of candidate deep neural networks; and selecting the neural network formation configuration based on the one or more metrics.

Example 36: The method as recited in example 35, wherein the obtaining the one or more metrics comprises: obtaining a respective error metric for each candidate deep neural network of the set of candidate deep neural networks to generate a set of error metrics; and comparing each error metric of the set of the error metrics to a threshold value, and wherein selecting the neural network formation configuration comprises: identifying a particular error metric in the set of error metrics that indicates less error relative to other error metrics in the set of error metrics; and selecting, as the neural network formation configuration, a particular candidate deep neural network, from the set of candidate deep neural networks, that corresponds to the particular error metric.

Example 37: The method as recited in any one of the preceding examples, wherein the message comprises a first message, the deep neural network comprises a first deep neural network, the neural network formation configuration comprises a first neural network formation configuration, the first message includes a first processing assignment that directs the user equipment to process control channel communications using the first deep neural network, and the method further comprises: receiving a second message that directs the user equipment to form a second deep neural network using a second neural network formation configuration, the second message including a second processing assignment for the second deep neural network; forming the second deep neural network with the second neural network formation by accessing the neural network table to obtain the second neural network formation configuration; and processing, based on the processing assignment, data channel communications transmitted over the wireless communication system using the second deep neural network.

Example 38: The method as recited in any one of the preceding examples, wherein the receiving the neural network table comprises receiving the neural network table in a multicast message.

Example 39: A network entity comprising: a wireless transceiver; a processor; and computer-readable storage media comprising instructions to implement a deep neural network manager module that, responsive to execution by the processor, directs network entity to perform any one of the methods of examples 21 to 29.

Example 40: A user equipment comprising: a wireless transceiver; a processor; and computer-readable storage media comprising instructions, responsive to execution by the processor, for directing the user equipment to perform one of the methods of examples 30 to 38.

What is claimed is:

1. A method performed by a network entity associated with a wireless communication system, the method comprising:
    determining a neural network formation configuration for a deep neural network for processing communications transmitted over the wireless communication system;
    generating a message that includes:
    an indication of the neural network formation configuration for the deep neural network; and
    an indication of a time instance to start using the deep neural network with the neural network formation configuration; and
    transmitting the message to a user equipment to direct the user equipment to form the deep neural network using the neural network formation configuration and to process the communications transmitted over the wireless communication system using the deep neural network.

2. The method as recited in claim 1, wherein the generating the message further comprises including a processing assignment for the deep neural network in the message.

3. The method as recited in claim 1, wherein the neural network formation configuration comprises a first neural network formation configuration, the message comprises a first message, and the method further comprises:
    receiving feedback from the user equipment that provides one or more metrics associated with the communications;
    determining a second neural network formation configuration for the deep neural network based, at least in part, on the feedback;
    generating a second message comprising an indication of the second neural network formation configuration for the deep neural network; and
    transmitting the second message to the user equipment to direct the user equipment to update the deep neural network with the second neural network formation configuration for the deep neural network.

4. The method as recited in claim 3, wherein the second neural network formation configuration for the deep neural network comprises a delta neural network formation configuration.

5. The method as recited in claim 1, wherein the determining the neural network formation configuration comprises determining the neural network formation configuration based, at least in part, on scheduling Multiple User, Multiple-Input, Multiple Output downlink transmissions in the wireless communication system.

6. The method as recited in claim 1, wherein the neural network formation configuration comprises a first neural network formation configuration, the deep neural network comprises a first deep neural network, the communications comprise downlink communications, and the method further comprises:
    determining a second neural network formation configuration for a second deep neural network for processing uplink communications from the user equipment; and
    transmitting the second neural network formation configuration for the second deep neural network to the user equipment and directing the user equipment to form the second deep neural network using the second neural network formation configuration for the second deep neural network, and to process the uplink communications using the second deep neural network.

7. The method as recited in claim 6, wherein the transmitting the message to direct the user equipment to form the deep neural network using the first neural network formation configuration comprises transmitting the message using a first radio access technology, and
    wherein the transmitting the second neural network formation configuration for the second deep neural network comprises transmitting the second neural network formation configuration for the second deep neural network using a second radio access technology that is different from the first radio access technology.

8. The method as recited in claim 1, wherein the message comprises a first message, and wherein the determining the neural network formation configuration for processing the communications comprises:
    receiving, from the user equipment, a second message that indicates one or more capabilities of the user equipment; and
    determining the neural network formation configuration based, at least in part, on the one or more capabilities of the user equipment.

9. A method performed by a user equipment associated with a wireless communication system, the method comprising:
    receiving, by the user equipment, a message that includes:
    an indication of a neural network formation configuration for a deep neural network for processing communications associated with the wireless communication system; and an indication of a time instance to start using the deep neural network with the neural network formation configuration;

forming the deep neural network using the neural network formation configuration indicated in the message;

receiving the communications from a base station; and processing the communications using the deep neural network to extract information in the communications.

10. The method as recited in claim 9, wherein the receiving the message comprises:

receiving a broadcast message from the base station; and extracting the neural network formation configuration and the indication of the time instance from the broadcast message.

11. The method as recited in claim 9, wherein the forming the deep neural network using the neural network formation configuration comprises extracting, from the message, the time instance that indicates a time to start using the neural network formation configuration to process the communications, and wherein the processing the communications using the deep neural network comprises processing the communications using the deep neural network based on the time indicated by the time instance.

12. The method as recited in claim 9, wherein the message comprises a first message, the deep neural network comprises a first deep neural network, the communications comprise downlink communications, the processing the communications comprises using the first deep neural network to decode information from the downlink communications, and the method further comprises:

receiving, by the user equipment, a second message that indicates a second neural network formation configuration for a second deep neural network for processing uplink communications transmitted over the wireless communication system;

forming the second deep neural network using the second neural network formation configuration; and processing the uplink communications using the second deep neural network to encode information on the uplink communications.

13. The method as recited in claim 9, wherein the neural network formation configuration comprises a first neural network formation configuration, the message comprises a first message and the method further comprises:

receiving a second message that indicates a second neural network formation configuration for the deep neural network; and forming the deep neural network using the second neural network formation configuration.

14. The method as recited in claim 13, wherein the second neural network formation configuration comprises a delta neural network formation configuration.

15. The method as recited in claim 9, wherein the receiving the message comprises receiving, in the message, an indication of a processing assignment of the deep neural network, wherein the forming the deep neural network comprises forming the deep neural network in a communications processing chain as specified in the processing assignment.

16. A network entity comprising:

a wireless transceiver;

a processor; and a non-transitory computer-readable storage media comprising instructions to implement a deep neural network manager module that, responsive to execution by the processor, directs the network entity to perform operations comprising:

determining a neural network formation configuration for a deep neural network for processing communications transmitted over a wireless communication system;

generating a message that includes:

an indication of the neural network formation configuration for the deep neural network; and an indication of a time instance to start using the deep neural network with the neural network formation configuration; and transmitting the message to a user equipment to direct the user equipment to form the deep neural network using the neural network formation configuration and to process the communications transmitted over the wireless communication system using the deep neural network.

17. The network entity as recited in claim 16, wherein the a non-transitory computer-readable storage media comprises further instructions that direct the network entity to perform transmitting the indication by:

transmitting at least one index value that maps to the neural network formation configuration in a neural network table.

18. The network entity as recited in claim 17, wherein the a non-transitory computer-readable storage media comprises further instructions that direct the network entity to perform further operations comprising:

transmitting, by the network entity and to a user equipment, the neural network table by transmitting a plurality of neural network formation configuration elements, each neural network formation configuration element of the plurality of neural network formation configuration elements configuring at least a portion of a deep neural network for processing communications transmitted over the wireless communication system.

19. The network entity as recited in claim 16, wherein transmitting the message further comprises:

transmitting the message that includes the indication of the neural network formation configuration and the indication of the time instance in one or more broadcast messages.

* * * * *